United States Patent
Koike

(10) Patent No.: US 11,961,999 B2
(45) Date of Patent: Apr. 16, 2024

(54) POSITIVE ELECTRODE, BATTERY AND METHOD FOR MANUFACTURING BATTERY, BATTERY PACK, ELECTRONIC DEVICE, ELECTRIC VEHICLE, ELECTRIC STORAGE DEVICE, AND ELECTRIC POWER SYSTEM

(71) Applicant: MURATA MANUFACTURING CO., LTD., Kyoto (JP)

(72) Inventor: Yosuke Koike, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 133 days.

(21) Appl. No.: 16/577,763

(22) Filed: Sep. 20, 2019

(65) Prior Publication Data
US 2020/0044243 A1 Feb. 6, 2020

Related U.S. Application Data

(63) Continuation of application No. PCT/JP2017/038630, filed on Oct. 26, 2017.

(30) Foreign Application Priority Data

Mar. 22, 2017 (JP) ................ 2017-056232

(51) Int. Cl.
| | |
|---|---|
| *H01M 4/36* | (2006.01) |
| *H01M 4/131* | (2010.01) |
| *H01M 4/133* | (2010.01) |
| *H01M 4/134* | (2010.01) |
| *H01M 4/38* | (2006.01) |
| *H01M 10/0525* | (2010.01) |

(52) U.S. Cl.
CPC ........... *H01M 4/366* (2013.01); *H01M 4/131* (2013.01); *H01M 4/133* (2013.01); *H01M 4/134* (2013.01); *H01M 4/386* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 9,627,722 B1 * | 4/2017 | Fan | ........... H01M 10/4235 |
| 2002/0058182 A1 | 5/2002 | Shiota et al. | |
| 2005/0079422 A1 | 4/2005 | Ko et al. | |
| 2008/0116423 A1 * | 5/2008 | Fan | ........... H01M 4/505 |
| | | | 252/502 |
| 2014/0154570 A1 | 6/2014 | Kan | |

(Continued)

FOREIGN PATENT DOCUMENTS

| | | |
|---|---|---|
| JP | 06064924 A * | 3/1994 |
| JP | H0664924 A | 3/1994 |

(Continued)

OTHER PUBLICATIONS

Machine translation of JP2013-054909A (Year: 2013).*
Machine translation of JP06-231749A (Year: 1993).*
Machine translation of WO2017/169126A1.*
J-G Hou et al., "Synthesis and piezoelectric properties of (Na0.5Bi0.5)0.94Ba0.06TiO3 ceramics prepared by sol-gel auto-combustion method", Journal of Materials Science 42, p. 6787-6791 (Year: 2007).*

(Continued)

*Primary Examiner* — Ryan S Cannon
(74) *Attorney, Agent, or Firm* — K&L Gates LLP

(57) ABSTRACT

A battery includes a positive electrode, a negative electrode, and an electrolyte, and the positive electrode includes a substituted barium titanate.

15 Claims, 7 Drawing Sheets

(56) References Cited

U.S. PATENT DOCUMENTS

| | | | |
|---|---|---|---|
| 2014/0178753 A1* | 6/2014 | Chu | H01M 4/62 429/211 |
| 2016/0072124 A1* | 3/2016 | Pan | H01M 4/0423 429/221 |
| 2016/0254511 A1* | 9/2016 | Hatta | H01M 10/0525 307/10.1 |

FOREIGN PATENT DOCUMENTS

| | | | | |
|---|---|---|---|---|
| JP | 06-231749 | | 8/1994 | |
| JP | H06231749 | A | 8/1994 | |
| JP | 10-241665 | | 9/1998 | |
| JP | H10241665 | A | 9/1998 | |
| JP | 2001-283861 | | 10/2001 | |
| JP | 2001283861 | A | 10/2001 | |
| JP | 2005-123185 | | 5/2005 | |
| JP | 2005123185 | A | 5/2005 | |
| JP | 2011210694 | A * | 10/2011 | |
| JP | 2013010642 | A | 1/2013 | |
| JP | 2013-054909 | | 3/2013 | |
| JP | 2013-054973 | | 3/2013 | |
| JP | 2013054909 | A | 3/2013 | |
| JP | 2013054973 | A | 3/2013 | |
| JP | 5825006 | B2 | 12/2015 | |
| JP | 2016119180 | A | 6/2016 | |
| JP | 2019-114323 | | 7/2019 | |
| WO | 2008/050875 | | 2/2010 | |
| WO | 2017169126 | A1 | 10/2017 | |
| WO | WO-2017169126 | A1 * | 10/2017 | H01M 4/13 |

OTHER PUBLICATIONS

Machine translation of WO2008/050875A1.*
Machine translation of JP06-064924A (Year: 1994).*
"Permittivity" [retrieved from https://en.wikipedia.org/wiki/Permittivity on Sep. 22, 2023]. (Year: 2023).*
Japanese Office Action dated Aug. 3, 2021 in corresponding Japanese Application No. 2017-056232.
L. Affleck, C. Leach, Microstructures of BaTiO3 based PTC thermistors with Ca, Sr and Pb additions, Journal of the European Ceramic Society, 2005, vol. 25, No. 12, pp. 3017-3020 (Abstract provided).
J. Seaton, C. Leach, Local property measurement in PTC thermistors, Acta Materialia, 2003, vol. 51, No. 20, pp.6027-6034 (Abstract provided).
Japanese Office Action dated Jun. 2, 2020 in corresponding Japanese Application No. 2017-056232.
International Search Report for Application No. PCT/JP2017/038630, dated Dec. 26, 2017.
Japanese Office Action dated Mar. 1, 2022 in corresponding Japanese Application No. 2017-056232.
Chinese Office Action dated Aug. 10, 2022 in corresponding Chinese Application No. 201780088675.8.
Japanese Office Action dated Jan. 5, 2021 in corresponding Japanese Application No. 2017-056232.
Chinese Office Action dated Dec. 3, 2021 in corresponding Chinese Application No. 201780088675.8.
Chinese Office Action dated May 11, 2022 in corresponding Chinese Application No. 201780088675.8.

* cited by examiner

POSITIVE ELECTRODE, BATTERY AND METHOD FOR MANUFACTURING BATTERY, BATTERY PACK, ELECTRONIC DEVICE, ELECTRIC VEHICLE, ELECTRIC STORAGE DEVICE, AND ELECTRIC POWER SYSTEM

CROSS REFERENCE TO RELATED APPLICATIONS

The present application is a continuation of PCT patent application no. PCT/JP2017/038630, filed on Oct. 26, 2017, which claims priority to Japanese patent application no. JP2017-056232 filed on Mar. 22, 2017, the entire contents of which are being incorporated herein by reference.

BACKGROUND

The present technology generally relates to a positive electrode, a battery and a method for manufacturing the battery, a battery pack, an electronic device, an electric vehicle, an electric storage device, and an electric power system.

In recent years, batteries have been used widely as power supplies for cellular phones, lap-top computers, electric tools, electric vehicles, and the like. Since the battery characteristics largely depend on the electrode, electrolyte and separator used for the battery, various techniques have been proposed for the members.

SUMMARY

The present technology generally relates to a positive electrode, a battery and a method for manufacturing the battery, a battery pack, an electronic device, an electric vehicle, an electric storage device, and an electric power system.

An object of the present technology is to provide a positive electrode, a battery and a method for manufacturing the battery, which are capable of improving safety, and a battery pack, an electronic device, an electric vehicle, an electric storage device, and an electric power system including the battery.

According to an embodiment of the present technology, a battery is provided. The battery includes a positive electrode, a negative electrode, and an electrolyte, and the positive electrode includes a substituted barium titanate.

According to an embodiment of the present technology, a battery is provided. The battery includes a positive electrode, a negative electrode, and an electrolyte, and the positive electrode includes a substituted perovskite oxide that has a PTC function.

According to an embodiment of the present technology, a positive electrode is provided. The positive electrode includes a substituted barium titanate.

According to an embodiment of the present technology, a method for manufacturing a battery is provided. The method includes mixing a positive electrode active material and a conductive agent and then adding a substituted barium titanate to prepare a paint, and forming a positive electrode active material layer with the use of the paint.

According to an embodiment of the present technology, a battery pack, an electronic device, an electric vehicle, an electric storage device, and an electric power system include the battery as described herein.

According to the present technology, the safety of the battery can be improved. It should be understood that the effects described herein are not necessarily to be considered limited, and may be any of the effects described in the present disclosure, or different effects therefrom, and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
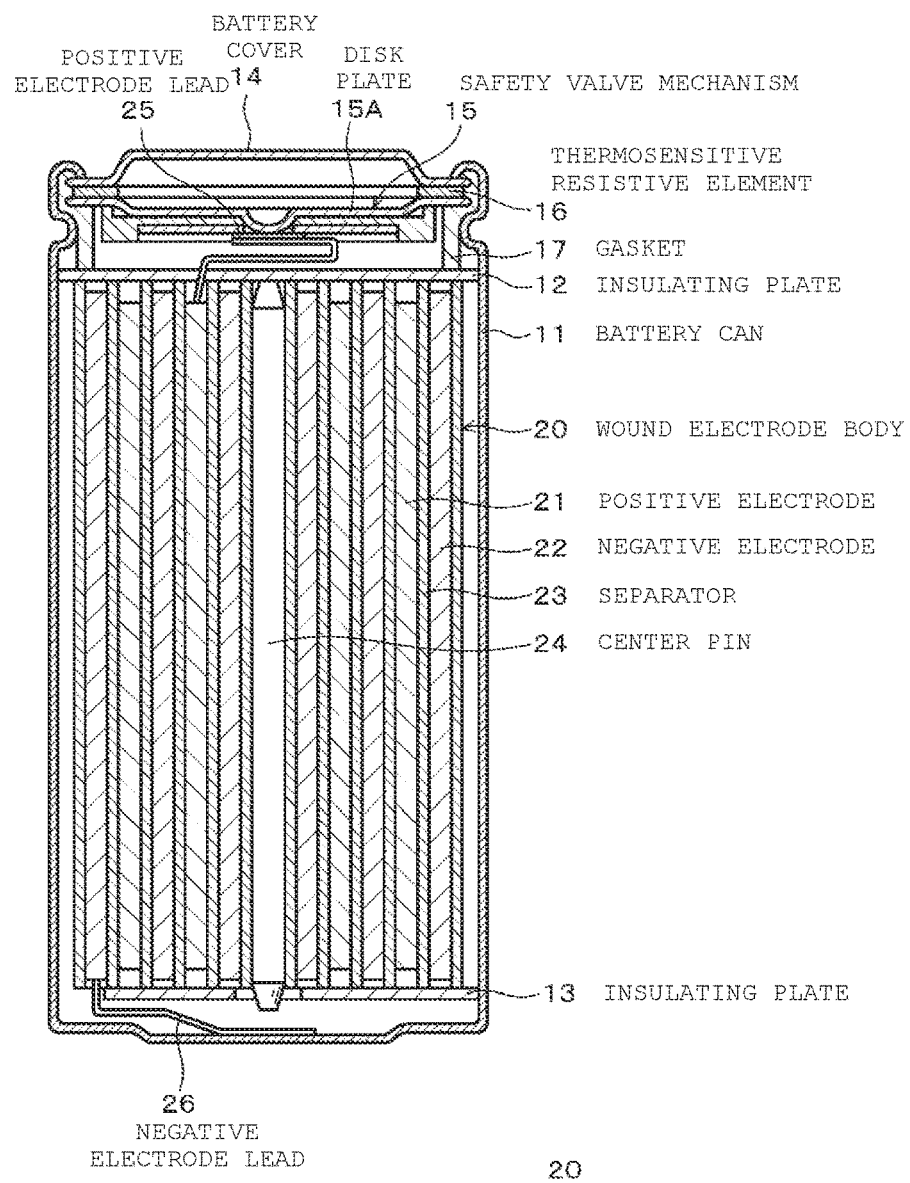
FIG. 1 is a cross-sectional view illustrating an example of the configuration of a secondary battery according to an embodiment of the present technology.

A configuration example of the secondary battery according to the first embodiment of the present technology will be described below with reference to FIG. 1. This secondary battery is, for example, a so-called lithium ion secondary battery in which the capacity of a negative electrode is represented by a capacity component obtained by occlusion and release of lithium (Li) which is an electrode reactant. The secondary battery has what is referred to as a so-called cylindrical type, which has, inside a substantially hollow cylindrical battery can 11, a spirally wound electrode body 20 with a pair of band-shaped positive electrodes 21 and band-shaped negative electrode 22 stacked with a separator 23 interposed therebetween and spirally wound. The battery can 11 is made of iron (Fe) plated with nickel (Ni), which has one end closed and the other end opened. Inside the battery can 11, an electrolytic solution as a liquid electrolyte is injected, with which the positive electrode 21, the negative electrode 22, and the separator 23 are impregnated. In addition, a pair of insulating plates 12, 13 is each disposed perpendicularly to the winding circumferential surface so as to sandwich the spirally wound electrode body 20.

The open end of the battery can 11 has a battery cover 14, and a safety valve mechanism 15 and a thermosensitive resistive element (Positive Temperature Coefficient; PTC element) 16 provided inside the battery cover 14, which are attached by crimping via a sealing gasket 17. Thus, the inside of the battery can 11 is hermetically sealed. The battery cover 14 is made of, for example, the same material as the battery can 11. The safety valve mechanism 15 is electrically connected to the battery cover 14, and in a case in which the internal pressure of the battery reaches a pressure equal to or higher than a certain level due to an internal short circuit of the battery or heating from the outside, or the like, intended to invert the disk plate 15A, and electrically disconnect the battery cover 14 and the wound electrode body 20. The sealing gasket 17 is made of, for example, an insulating material, and the surface thereof is coated with asphalt.

For example, a center pin 24 is inserted in the center of the wound electrode body 20. A positive electrode lead 25 made of aluminum (Al) or the like is connected to the positive electrode 21 of the wound electrode body 20, and a negative electrode lead 26 made of nickel or the like is connected to the negative electrode 22. The positive electrode lead 25 is welded to the safety valve mechanism 15 to be electrically connected to the battery cover 14, and the negative electrode lead 26 is welded to the battery can 11 to be electrically connected thereto.

The impedance ratio (Z2/Z1) between the impedance Z1 of the battery at 30° C. and the impedance Z2 of the battery at 150° C. is preferably 4 or more, more preferably 5 or more, still more preferably or 6 more, particularly preferably 7 or more, from the viewpoint of improving the safety of the battery.

The above-mentioned impedance ratio (Z2/Z1) is determined as follows. First, after the safety mechanism or protective circuit such as the thermal resistance element 16 is removed or turned to not to function, the impedance Z1 and impedance Z2 of the battery at 30° C. and 150° C. are measured with the use of a battery high tester (model: 3561. manufactured by HIOKI E.E. CORPORATION). Next, the impedance ratio (Z2/Z1) is determined with the use of the measured impedance Z1 and the measured impedance Z2.

Figure 2:
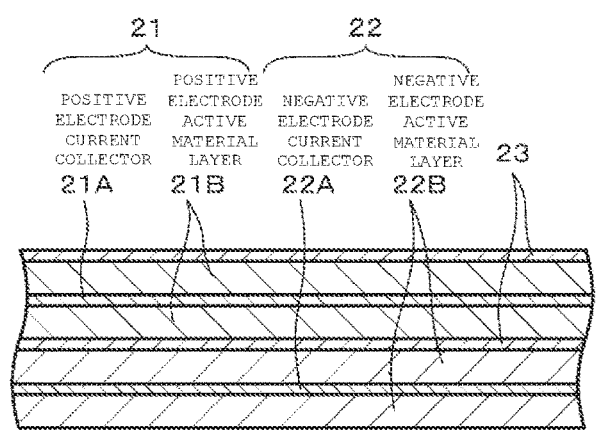
FIG. 2 is a cross-sectional view illustrating an enlarged part of the wound electrode body shown in FIG. 1.

The positive electrode 21, the negative electrode 22, the separator 23, and the electrolytic solution constituting the secondary battery will be sequentially described below with reference to FIG. 2.

The positive electrode 21 has a PTC function. This PTC function preferably has the characteristics of sharply increasing the resistance within the range of 100° C. or higher and 200° C. or lower. The positive electrode 21 has, for example, a structure with a positive electrode active material layer 21B provided on both surfaces of a positive electrode current collector 21A. It should be understood that, although not shown, the positive electrode active material layer 21B may be provided only on one surface of the positive electrode current collector 21A. The positive electrode current collector 21A is made from, for example, metal foil such as aluminum foil, nickel foil, or stainless steel foil. The positive electrode active material layer 21B includes, for example, a positive electrode active material capable of occluding and releasing lithium which is an electrode reactant, and a substituted perovskite oxide. The positive electrode active material layer 21B may further contain an additive, if necessary. For example, at least one of a conductive agent and a binder can be used as the additive.

The positive electrode active material is a powder of positive electrode active material particles. As the positive electrode active material capable of occluding and releasing lithium, a lithium containing compound is suitable, for example, such as a lithium oxide, a lithium phosphorus oxide, a lithium sulfide or an intercalation compound containing lithium, and two or more thereof may be used in mixture. In order to increase the energy density, a lithium-containing compound containing lithium, a transition metal element, and oxygen (O) is preferred. Examples of such a lithium-containing compound include, for example, a lithium composite oxide that has a layered rock-salt type structure as represented by the formula (A), and a lithium composite phosphate that has an olivine-type structure as represented by the formula (B). The lithium-containing compound more preferably contains at least one selected from the group consisting of cobalt (Co), nickel, manganese (Mn), and iron as the transition metal element. Examples of such a lithium-containing compound include, for example, a lithium composite oxide that has a layered rock-salt type structure as represented by the formula (C), the formula (D) or the formula (E), a lithium composite oxide that has a spinel-type structure as represented by the formula (F), and a lithium composite phosphate that has an olivine-type structure represented by the formula (G), and specifically, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

(In the formula (A), M1 represents at least one element selected from Group 2 to Group 15 excluding nickel and manganese. X represents at least one of Group 16 elements and Group 17 elements excluding oxygen. p, q, y and z represent values within the ranges of 0≤p≤1.5, 0≤q≤1.0, 0≤r≤1.0, −0.10≤y≤0.20, and 0≤z≤0.2.)

(In the formula (B), M2 represents at least one element selected from Group 2 to Group 15 elements. a and b represent values within the ranges of 0≤a≤2.0 and 0.5≤b≤2.0.)

(In the formula (C), M3 represents at least one element from the group consisting of cobalt, magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr) and tungsten (W). f, g, h, j and k represent values within the ranges of 0.8≤f≤1.2, 0<g<0.5, 0≤h≤0.5, g+h<1, −0.1≤j≤0.2, and 0≤k≤0.1. It should be understood that the composition of lithium varies depending on the state of charge/discharge, and the value of f represents a value in a fully discharged state.)

(In the formula (D), M4 represents at least one from the group consisting of cobalt, manganese, magnesium, aluminum, boron, titanium, vanadium, chromium, iron, copper, zinc, molybdenum, tin, calcium, strontium and tungsten. m, n, p, and q represent values within the ranges of 0.8≤m≤1.2, 0.005≤n≤0.5, −0.1≤p≤0.2, and 0≤q≤0.1. It should be understood that the composition of lithium varies depending on the state of charge/discharge, and the value of m represents a value in a fully discharged state.)

(In Formula (E), M5 represents at least one from the group consisting of nickel, manganese, magnesium, aluminum, boron, titanium, vanadium, chromium, iron, copper, zinc, molybdenum, tin, calcium, strontium and tungsten. r, s, t and u represents values within the ranges of 0.8≤r≤1.2, 0≤s≤0.5, −0.1≤t≤0.2, and 0≤u≤0.1. The composition of lithium varies depending on the state of charge and discharge, and the value of r represents the value in a fully discharged state.)

$$Li_vMn_{2-w}M6_wO_xF_y \quad (F)$$

(In the formula (F), M6 represents at least one from the group consisting of cobalt, nickel, magnesium, aluminum, boron, titanium, vanadium, chromium, iron, copper, zinc, molybdenum, tin, calcium, strontium and tungsten. v, w, x and y represent values within the ranges 0.9≤v≤1.1, 0≤w≤0.6, 3.7≤x≤4.1, and 0≤y≤0.1. The composition of lithium varies depending on the state of charge and discharge, and the value of v represents the value in a fully discharged state.)

$$Li_zM7PO_4 \quad (G)$$

(In Formula (G), M7 represents at least one from the group consisting of cobalt, manganese, iron, nickel, magnesium, aluminum, boron, titanium, vanadium, niobium (Nb), copper, zinc, molybdenum, calcium, strontium, tungsten and zirconium. z represents a value within the range 0.9≤z≤1.1. The composition of lithium varies depending on the state of charge and discharge, and the value of z represents the value in a fully discharged state.)

In addition to the foregoing, other examples of the positive electrode active material capable of occluding and releasing lithium also include inorganic compounds containing no lithium, such as $MnO_2$, $V_2O_5$, $V_6O_{13}$, NiS, and MoS.

The positive electrode active material capable of occluding and releasing lithium may be any other than those mentioned above. In addition, two or more of the positive electrode active materials exemplified above may be mixed in arbitrary combination.

The substituted perovskite oxide mainly contains a substituted barium titanate. The substituted perovskite oxide may be present entirely in the positive electrode active material layer 21B or may be present partially in the positive electrode active material layer 21B, but from the viewpoint of improving the safety of the battery, is preferably present entirely in the positive electrode active material layer 21B. The concentration distribution of the substituted perovskite oxide may be constant or varied in the thickness direction of the positive electrode active material layer 21B.

The substituted perovskite oxide is a powder of substituted perovskite oxide particles. Specifically, the substituted perovskite oxide is a powder containing substituted barium titanate particles. Examples of the shapes of the substituted perovskite oxide particles include, but not particularly limited to, spherical, ellipsoidal, needle, plate, scale, tube, wire, bar (rod), and irregular shapes. It should be understood that two or more of the particles in the shapes mentioned above may be used in combination.

The substituted perovskite oxide is a substituted perovskite oxide that has a PTC function. The substituted perovskite oxide preferably has a Curie temperature in the range of 100° C. or higher and 200° C. or lower. More specifically, it is preferable to have characteristics of sharply increasing the resistance within the range of 100° C. or higher and 200° C. or lower.

The PTC function is, from the viewpoint of improving the safety of the battery, a function by which the pellet resistance of the substituted perovskite oxide is preferably increased by twice or more, more preferably 10 times or more, still more preferably 1000 times or more, particularly preferably 10000 times or more, within the range of 100° C. or higher and 200° C. or lower. In this regard, the phrase of "increase by n times or more" means that the resistance value is increased by n times or more within the range of 100° C. or higher and 200° C. or lower, on the basis of the minimum value of the resistance within the range of 100° C. or higher and 200° C. or lower.

The increase in the resistance value of the substituted perovskite oxide is measured as follows. First, a powder of the substituted perovskite oxide is subjected to compression molding into a pellet of 3.5 mm in diameter, 0.5 mm in thickness, and 5.5 g/cc in volume density, and then to firing at 1300° C. to prepare a measurement sample, and electrodes made of gold (Au) are formed on both sides. Next, the resistance value of the measurement sample is measured by a two-terminal method while heating the measurement sample within the range of 100° C. or higher and 200° C. or lower.

The substituted barium titanate preferably contains at least one of: a barium titanate in which contained barium is partially substituted with at least one element of alkaline earth metals; a barium titanate in which contained barium is partially substituted with at least one element of alkaline earth metals and lead; and a barium titanate in which contained barium is partially substituted with at least one element of alkali metals and bismuth. In this regard, the alkaline earth metal is preferably at least one of strontium and calcium. The alkali metal is preferably at least one of sodium and calcium.

More specifically, the substituted barium titanate preferably contains at least one of barium strontium titanate, barium bismuth sodium titanate, and barium strontium calcium lead titanate. The barium strontium titanate, the barium bismuth sodium titanate, and the barium strontium calcium lead titanate are preferably represented respectively by the following formulas (1), (2), and (3):

$$(Ba_{1-v}Sr_v)TiO_3 \quad (1)$$

(in the formula (1), v meets 0<v≤0.5)

$$(Ba_{1-u-w}Bi_uNa_w)TiO_3 \quad (2)$$

(in the formula (2), u meets 0<u<0.5, and w meets 0<w<0.5)

$$(Ba_{1-x-y-z}Pb_xSr_yCa_z)TiO_3 \quad (3)$$

(in the formula (3), x meets 0<x≤0.5, y meets 0<y≤0.2, and z meets 0<z≤0.2)

The average particle size of the substituted perovskite oxide particles is preferably 20 nm or more, more preferably 0.3 μm or more, still more preferably 1 μm or more, and particularly preferably 5 μm or more. When the average particle size of the substituted perovskite oxide particles is 20 nm or more, the PTC function as the particles can be further improved. Thus, the effect of suppressing the generation of Joule heat at the time of abnormal temperature rise can be further improved. Moreover, the properties (for example, sedimentation, thixotropy, etc.) of the positive electrode combination paint (positive electrode combination slurry) can be kept from being degraded. The average particle size of the substituted perovskite oxide is preferably equal to or less than the average particle size of the positive electrode active material particles. In a case where the average particle size of the substituted perovskite oxide exceeds the average particle size of the positive electrode active material particles, the density of the positive electrode combination at the time of pressing is decreased, thereby decreasing the energy density per cell volume.

The average particle size of the above-mentioned substituted perovskite oxide particles is determined as follows. First, a cross section of the positive electrode 21 is prepared by ion milling or the like, and a SEM image of the cross section is taken. Next, 100 substituted perovskite oxide particles are randomly selected from the cross-sectional SEM image, and the particle sizes D of the particles are measured to obtain the particle size distribution of the substituted perovskite oxide particles. In this regard, in a case where the particle is not spherical, the largest distance among the distances between two parallel lines drawn from all angles so as to come into contact with the particle outline (so-called maximum Feret diameter) is regarded as the particle size of the particle. Subsequently, a median diameter (50% diameter, D50) is determined from the obtained particle size distribution, and regarded as an average particle size.

The above-mentioned average particle size of the positive electrode active material particles is determined in the same way as how to determine the above-mentioned average particle size of the substituted perovskite oxide particles, except that 100 positive electrode active material particles are randomly selected from the cross-sectional SEM image.

The content of the substituted perovskite oxide in the positive electrode active material layer 21B is preferably 0.01% by mass or more and 2% by mass or less, and more preferably 0.02% by mass or more and 0.2% by mass or less. When the content of the substituted perovskite oxide is 0.01% by mass or more, the generation of Joule heat at the time of abnormal temperature rise of the battery can be particularly suppressed. Thus, the safety of the battery can be particularly improved. On the other hand, when the content of the substituted perovskite oxide is 2% by mass or less, the inhibition of the movements of electrons and ions can be suppressed, and the charge/discharge characteristics (specifically, battery capacity, cycle characteristics, etc.) can be thus kept from being degraded.

The above-mentioned content of the substituted perovskite oxide is determined as follows. First, after cleaning the positive electrode 21 containing the substituted perovskite oxide, the positive electrode active material layer 21B is peeled off from the positive electrode current collector 21A such as aluminum foil. Next, the weight loss of the positive electrode active material layer 21B up to 1000° C. is measured with the use of a thermogravimetric analyzer (TG). The weight loss around 850° C. is regarded as the binder and the conductive agent, and the balance is regarded as the weight sum of the positive electrode active material and the substituted perovskite oxide. Subsequently, the content ratio between the positive electrode active material and the substituted perovskite oxide is measured with the use of an inductively-coupled plasma (ICP) emission spectrometer. In the case of the positive electrode active material (for example, $LiCoO_2$) and the substituted perovskite oxide (for example, $Ba_{0.9}Sr_{0.1}TiO_3$), it is possible to specify the content and composition of the substituted perovskite oxide from the ratios by weight of the metal elements (if necessary, the positive electrode active material and the substance identification of the substituted perovskite oxide may be subjected to substance identification with the use of XRD before the ICP.).

The specific surface area ratio between the substituted perovskite oxide particles and the conductive agent particles (the specific surface area of the substituted perovskite oxide particles/the specific surface area of the conductive agent particles) is preferably 0.01 or more and 0.2 or less.

For example, at least one selected from resin materials such as polyvinylidene fluoride (PVdF), polytetrafluoroethylene (PTFE), polyacrylonitrile (PAN), styrene butadiene rubber (SBR) and carboxymethyl cellulose (CMC), and copolymers mainly of the resin materials is used as the binder.

The conductive agent is a powder of conductive agent particles. Examples of the conductive agent include carbon materials such as graphite, carbon fibers, carbon black, Ketjen black, or carbon nanotubes, for example, and one of these materials may be used alone, or two or more thereof may be used in mixture. Besides the carbon materials, a metal material, a conductive polymer material, or the like may be used as long as the material has conductivity.

The negative electrode 22 has, for example, a structure with a negative electrode active material layer 22B provided on both surfaces of a negative electrode current collector 22A. It should be understood that, although not shown, the negative electrode active material layer 22B may be provided only on one surface of the negative electrode current collector 22A. The negative electrode current collector 22A is made from, for example, metal foil such as copper foil, nickel foil, or stainless steel foil.

The negative electrode active material layer 22B includes one, or two or more negative electrode active materials capable of occluding and releasing lithium. The negative electrode active material layer 22B may further contain an additive such as a binder and a conductive agent, if necessary.

It should be understood that in this secondary battery, the electrochemical equivalent of the negative electrode 22 or the negative electrode active material is larger than the electrochemical equivalent of the positive electrode 21, and theoretically, lithium metal is preferably kept from being precipitated on the negative electrode 22 in the course of charging.

Examples of the negative electrode active material include, for example, carbon materials such as non-graphitizable carbon, graphitizable carbon, graphite, pyrolytic carbon, coke, glassy carbon, a fired body of organic polymer compound, carbon fibers, or activated carbon. Among the foregoing materials, examples of the coke include pitch coke, needle coke, and petroleum coke. The fired body of organic polymer compound refers to product carbonized by firing polymer materials such as phenolic resins or furan resins at appropriate temperatures, and some of the products are classified in non-graphitizable carbon or graphitizable carbon. These carbon materials are preferred because the crystal structures produced during charging/discharging undergo little change, thereby making it possible to achieve a high charge/discharge capacity, and making it possible to achieve favorable cycle characteristics. In particular, graphite is preferred because of its large electrochemical equivalent, which allows for the achievement of a high energy density. In addition, non-graphitizable carbon is preferred because excellent cycle characteristics are achieved. Furthermore, materials that are low in charge/discharge potential, specifically materials that are close in charging/discharging potential to lithium metal, are preferred because the materials can easily achieve increases in the energy density of the battery.

In addition, examples of another negative electrode active material capable of increasing the capacity also include a material containing at least one of a metal element and a metalloid element as a constituent element (for example, an alloy, a compound, or a mixture). This is because the use of such a material can achieve a high energy density. In particular, the use together with a carbon material is more preferred because a high energy density can be achieved, and because excellent cycle characteristics can be achieved. It should be understood that, in the present technology, examples of the alloy includes, in addition to alloys composed of two or more metal elements, alloys containing one or more metal elements and one or more metalloid elements. In addition, the alloy may also contain a nonmetallic element. Examples of the compositional structure include a solid solution, a eutectic (eutectic mixture), an intermetallic compound, or a mixture of two or more thereof.

Examples of such a negative electrode active material include, for example, a metal element or a metalloid element capable of forming an alloy with lithium. Specifically, the examples include magnesium, boron, aluminum, titanium, gallium (Ga), indium (In), silicon (Si), germanium (Ge), tin, lead (Pb), bismuth (Bi), cadmium (Cd) silver (Ag), zinc, hafnium (Hf), zirconium, yttrium (Y), palladium (Pd), or platinum (Pt). These may be crystalline or amorphous.

As the negative electrode active material, a material containing, as a constituent element, a metal element or a metalloid element of Group 4B in the short periodic table is preferred, and more preferred is a material containing at least one of silicon and tin as a constituent element. This is because silicon and tin are high in ability to occlude and release lithium, and thus capable of achieving a high energy density. Examples of such a negative electrode active material include: a simple substance, an alloy, or a compound of silicon; a simple substance, an alloy, or a compound of tin; and a material that at least partially has a phase of one, or two or more thereof.

Examples of the alloy of silicon include, for example, an alloy containing, as a second constituent element other than silicon, at least one from the group consisting of tin, nickel, copper, iron, cobalt, manganese, zinc, indium, silver, titanium, germanium, bismuth, antimony (Sb) and chromium. Examples of the alloy of tin include, for example, an alloy containing, as a second constituent element other than tin, at least one from the group consisting of silicon, nickel, copper, iron, cobalt, manganese, zinc, indium, silver, titanium, germanium, bismuth, antimony and chromium.

Examples of the compound of tin or the compound of silicon include, for example, a compound containing oxygen or carbon, and may contain, in addition to tin or silicon, the second constituent element described above.

Above all, as a Sn-based negative electrode active material, a SnCoC-containing material is preferred which contains cobalt, tin, and carbon as constituent elements, where the content of carbon is 9.9% by mass or more and 29.7% by mass or less, and the proportion of cobalt to the total of tin and cobalt is 30% by mass or more and 70% by mass or less. This is because in such a composition range, a high energy density can be achieved, and excellent cycle characteristics can be achieved.

This SnCoC-containing material may further contain other constituent elements, if necessary. The other constituent elements preferably include, for example, silicon, iron, nickel, chromium, indium, niobium, germanium, titanium, molybdenum, aluminum, phosphorus (P), gallium or bismuth, and the material may contain two or more thereof. This is because the capacity or cycle characteristics can be further improved.

It should be understood that this SnCoC-containing material has a phase containing tin, cobalt, and carbon, and this phase preferably has a low crystalline or amorphous structure. In addition, in this SnCoC-containing material, the carbon as a constituent element is preferably at least partially bonded to a metal element or a metalloid element which is another constituent element. This is because, while deterioration of cycle characteristics is believed to be caused by aggregation or crystallization of tin or the like, the carbon is bonded to another element, thereby making it possible to suppress such aggregation or crystallization.

Examples of a measurement method for examining the bonding state of the element include, for example, an X-ray photoelectron spectroscopy (XPS). In accordance with XPS, the peak of the is orbit (Cis) of carbon appears at 284.5 eV, in the case of graphite, in a device calibrated in terms of energy so that the peak of the 4f orbital (Au4f) of a gold atom is obtained at 84.0 eV. In addition, in the case of surface contaminated carbon, the peak appears at 284.8 eV. In contrast, when the carbon element increases in charge density, the peak of Cis appears in a lower range than 284.5 eV, for example, when carbon is bonded to a metal element or a metalloid element. More specifically, when the peak of a synthetic wave of C1s obtained for the SnCoC-containing material appears in a lower range than 284.5 eV, the carbon included in the SnCoC-containing material is at least partially bonded to a metal element or a metalloid element as another constituent element.

It should be understood that in the XPS measurement, for example, the peak of C1s is used for the correction of the energy axis of the spectrum. Typically, surface contaminated carbon is present on the surface, the peak of C1s of surface contaminated carbon is determined to be 284.8 eV, which is regarded as an energy reference. In the XPS measurement, the waveform of the peak of C1s is obtained in a form including the peak of the surface contaminated carbon and the peak of the carbon in the SnCoC-containing material, and thus, the analysis with the use of, for example, commercially available software separates the peak of the surface contaminated carbon from the peak of the carbon in the SnCoC-containing material. In the analysis of the waveform, the position of the main peak present on the lowest binding energy side is determined to be an energy reference (284.8 eV).

Examples of other negative electrode active materials also include, for example, a metal oxide or a polymer compound capable of occluding and releasing lithium. Examples of the metal oxide include, for example, a lithium titanium oxide containing titanium and lithium such as lithium titanate ($Li_4Ti_5O_{12}$), an iron oxide, a ruthenium oxide, or a molybdenum oxide. Examples of the polymer compound include, for example, polyacetylene, polyaniline, or polypyrrole.

As the binder, for example, at least one is used which is selected from resin materials such as polyvinylidene fluoride, polytetrafluoroethylene, polyacrylonitrile, styrene butadiene rubber, and carboxymethyl cellulose, and copolymers mainly composed of the resin materials, and the like.

As the conductive agent, the same carbon material as the positive electrode active material layer 21B, or the like can be used.

The separator 23 is intended to separate the positive electrode 21 and the negative electrode 22, thereby allowing passage of lithium ions while preventing short circuits due to the current caused by contact between the both electrodes. The separator 23 is composed of, for example, a porous membrane made from a resin such as polytetrafluoroethylene, polypropylene, or polyethylene, and may be adapted to have a structure obtained by laminating two or more of such porous membranes. Above all, a porous membrane made from polyolefin is preferred because the membrane has an excellent short circuit-prevention effect, and can make an improvement in battery safety by a shutdown effect. In particular, polyethylene is preferred as a material constituting the separator 23, because polyethylene can achieve the shutdown effect within a range of 100° C. or higher and 160° C. or lower, and also has excellent electrochemical stability. Besides, a material can be used which is obtained by copolymerizing or blending a chemically stable resin with polyethylene or polypropylene. Alternatively, the porous membrane may have a structure of three or more layers, where a polypropylene layer, a polyethylene layer, and a polypropylene layer are sequentially laminated.

The separator 23 may be configured to include a base material and a surface layer provided on one or both sides of the base material. The surface layer includes inorganic particles that have electrical insulation properties, and a resin material that binds the inorganic particles to the surface of the base material and binds the inorganic particles to each other. This resin material may be, for example, fibrillated to have a three-dimensional network structure with fibrils continuously interconnected. The inorganic particles are supported on the resin material which has the three-dimensional network structure, thereby making it possible to maintain the dispersed state without connecting to each other. Alternatively, the resin material may bind the surface of the base material or bind the inorganic particles to each other without being fibrillated. In this case, a higher binding ability can be achieved. The surface layer is provided on one or both surfaces of the base material as described above, thereby making it possible to impart oxidation resistance, heat resistance, and mechanical strength to the base material.

The base material is a porous layer that has porosity. More specifically, the base material is a porous membrane composed of an insulating film which has high ion permeability and predetermined mechanical strength, and the electrolytic solution is held in the pores of the base material. The base material preferably has predetermined mechanical strength as a main part of the separator, but also requires the characteristics of high resistance to the electrolytic solution, low reactivity, and difficulty with expansion.

It is preferable to use, as the resin material constituting the base material, for example, a polyolefin resin such as polypropylene or polyethylene, an acrylic resin, a styrene resin, a polyester resin, a nylon resin, or the like. In particular, polyethylene such as low-density polyethylene, high-density polyethylene, or linear polyethylene, or the low molecular weight wax thereof, or a polyolefin resin such as polypropylene is suitably used because of its appropriate melting temperature and availability. Alternatively, a laminated structure of two or more of the porous membranes, or a porous membrane formed by melting and kneading two or more of the resin materials may be adopted. The inclusion of a porous membrane made of a polyolefin resin has excellent separability between the positive electrode 21 and the negative electrode 22, and can further reduce the reduced internal short circuit.

As the base material, a nonwoven fabric may be used. Aramid fibers, glass fibers, polyolefin fibers, polyethylene terephthalate (PET) fibers, nylon fibers, or the like can be used as fibers constituting the nonwoven fabric. Alternatively, two or more of the fibers may be mixed as the nonwoven fabric.

The inorganic particles contain at least one of a metal oxide, a metal nitride, a metal carbide, a metal sulfide, and the like. Aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide silica, $SiO_2$), yttrium oxide (yttria, $Y_2O_3$), or the like can be suitably used as the metal oxide. Silicon nitride ($Si_3N_4$), aluminum nitride (AlN), boron nitride (BN), titanium nitride (TiN), or the like can be suitably used as the metal nitride. Silicon carbide (SiC), boron carbide (B4C), or the like can be suitably used as the metal carbide. Barium sulfate ($BaSO_4$) or the like can be suitably used as the metal sulfide. Further, minerals may be used, e.g., porous aluminosilicate such as zeolite ($M_{2/n}O \cdot Al_2O_3 \cdot xSiO_2 \cdot yH_2O$, M is a metal element, $x \geq 2$, $y \geq 0$), layered silicate, barium titanate ($BaTiO_3$), or strontium titanate ($SrTiO_3$). Among the minerals, it is preferable to use alumina, titania (particularly, titania that has a rutile-type structure), silica, or magnesia, and it is more preferable to use alumina. The inorganic particles have oxidation resistance and heat resistance, and the surface layer at the side surface opposed to the positive electrode containing the inorganic particles also has strong resistance to an oxidizing environment near the positive electrode at the time of charging. The shapes of the inorganic particles are not particularly limited, and any of spherical, plate-like, fibrous, cubic, and random shapes and the like can be used.

Examples of the resin material constituting the surface layer include fluorine-containing resins such as polyvinylidene fluoride and polytetrafluoroethylene, fluorine-containing rubbers such as vinylidene fluoride-tetrafluoroethylene copolymers and ethylene-tetrafluoroethylene copolymers, styrene-butadiene copolymers or hydrogenated products thereof, acrylonitrile-butadiene copolymers or hydrogenated products thereof, acrylonitrile-butadiene-styrene copolymers or hydrogenated product thereof, methacrylic acid ester-acrylic acid ester copolymers, styrene-acrylic acid ester copolymers, acrylonitrile-acrylic acid ester copolymers, rubbers such as ethylene propylene rubbers, polyvinyl alcohol, and polyvinyl acetate, cellulose derivatives such as ethyl cellulose, methyl cellulose, hydroxyethyl cellulose, and carboxymethyl cellulose, polyphenylene ether, polysulfone, polyethersulfone, polyphenylene sulfide, polyether imide, polyimide, polyamides such as wholly aromatic polyamide (aramid), resins which have high heat resistance such that at least one of a melting point and a glass transition temperature is 180° C. or higher, such as polyamide imide, polyacrylonitrile, polyvinyl alcohol, polyether, acrylic acid resins, or polyester. These resin materials may be used alone, or two or more thereof may be used in mixture. Among the materials, fluorine-based resins such as polyvinylidene fluoride are preferable from the viewpoint of oxidation resistance and flexibility, and from the viewpoint of heat resistance, aramid or polyamideimide is preferably included.

The inorganic particles preferably fall within the range of 1 nm to 10 μm in particle size. If the particle size is smaller than 1 nm, the inorganic substance is difficult to obtain, and even if the substance is available, the substance is not suitable in terms of cost. On the other hand, if the particle size is larger than 10 μm, the distance between the electrodes is increased, thereby achieving an insufficient amount of active material in a limited space, and thus decreasing the battery capacity.

As a method for forming the surface layer, a method can be used in which a slurry composed of the matrix resin, a solvent, and the inorganic substance is applied onto the base material (porous membrane), passed through a poor solvent of the matrix resin and a good solvent bath of the solvent to cause phase separation, and then dried.

It should be understood that the porous film as a base material may contain therein the above-described inorganic particles. Further, the surface layer may be, without including any inorganic particle, composed only of a resin material.

The separator 23 is impregnated with an electrolytic solution which is a liquid electrolyte. The electrolytic solution includes a solvent and an electrolyte salt dissolved in the solvent. In order to improve the battery characteristics, the electrolytic solution may contain known additives.

As the solvent, a cyclic carbonate such as ethylene carbonate or propylene carbonate can be used, and it is preferable to use one of ethylene carbonate and propylene carbonate, particularly, use the both in mixture. This is because cycle characteristics can be improved.

As the solvent, and in addition to the foregoing cyclic carbonate esters, it is preferable to use, in mixture, a chain carbonate such as diethyl carbonate, dimethyl carbonate, ethyl methyl carbonate, or methyl propyl carbonate. This is because high ionic conductivity can be achieved.

The solvent preferably further contains 2,4-difluoroanisole or vinylene carbonate. This is because 2,4-difluoroanisole can improve the discharge capacity, whereas vinylene carbonate can improve cycle characteristics. Therefore, it is preferable to use the foregoing compounds in mixture, because the discharge capacity and cycle characteristics can be improved.

Besides the foregoing, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, or trimethyl phosphate.

It should be understood that compounds in which at least some hydrogen of these non-aqueous solvents is substituted with fluorine may be preferred, because the compounds can sometimes improve the reversibility of the electrode reactions depending on the types of the electrodes to be combined.

Examples of the electrolyte salt include, for example, a lithium salt, and one type of electrolyte salt may be used alone, or two or more types of electrolyte salts may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O'] lithium borate, lithium bis(oxalate)borate, or LiBr. Above all, $LiPF_6$ is preferred, because $LiPF_6$ can achieve high ionic conductivity and improve cycle characteristics.

The positive electrode potential (vs $Li/Li^+$) in the fully charged state is preferably 4.30 V or higher, more preferably 4.35 V or higher, still more preferably 4.40 V or higher, particularly preferably 4.45 V or higher. The positive electrode potential (vs $Li/Li^+$) in the fully charged state may be, however, lower than 4.30 V (for example, 4.2 V or 4.25 V). The upper limit of the positive electrode potential (vs $Li/Li^+$) in the fully charged state is not particularly limited, but is preferably 6.00 V or lower, more preferably 4.60 V or lower, and still more preferably 4.50 V or lower.

In the non-aqueous electrolyte secondary battery configured as described above, on charging, for example, lithium ions are released from the positive electrode active material layer 21B, and occluded by the negative electrode active material layer 22B through the electrolytic solution. Further, on discharging, for example, lithium ions are released from the negative electrode active material layer 22B, and occluded by the positive electrode active material layer 21B through the electrolytic solution.

Next, an example of a method for manufacturing the secondary battery according to the first embodiment of the present technology will be described.

First, for example, a positive electrode combination is prepared by mixing a positive electrode active material, a conductive agent, and a binder, and this positive electrode combination is mixed with a solvent such as N-methyl-2-pyrrolidone (NMP), thereby providing a mixture. Next, a substituted perovskite oxide containing a substituted barium titanate is added to the mixture, and dispersed therein to prepare a positive electrode combination slurry as a paint. Next, the positive electrode combination slurry is applied to the positive electrode current collector 21A, and subjected to solvent drying, and to compression molding by a roll press machine or the like to form the positive electrode active material layer 21B, thereby forming the positive electrode 21.

In addition, for example, a negative electrode combination is prepared by mixing a negative electrode active material and a binder, and this negative electrode combination is dispersed in a solvent such as N-methyl-2-pyrrolidone, thereby preparing a negative electrode combination slurry as a paint. Next, the negative electrode combination slurry is applied to the negative electrode current collector 22A, and subjected to solvent drying, and to compression molding by a roll press machine or the like to form the negative electrode active material layer 22B, thereby preparing the negative electrode 22.

Next, the positive electrode lead 25 is attached by welding or the like to the positive electrode current collector 21A, and the negative electrode lead 26 is attached by welding or the like to the negative electrode current collector 22A. Next, the positive electrode 21 and the negative electrode 22 are wound with the separator 23 interposed therebetween. Next, the head of the positive electrode lead 25 is welded to the safety valve mechanism 15, and the head of the negative electrode lead 26 is welded to the battery can 11, and the wound positive electrode 21 and negative electrode 22 are sandwiched between the pair of insulating plates 12 and 13, and housed in the battery can 11. Next, after the positive electrode 21 and the negative electrode 22 are housed in the battery can 11, an electrolytic solution is injected into the battery can 11 to impregnate the separator 23. Next, the battery cover 14, the safety valve mechanism 15, and the thermosensitive resistive element 16 are fixed to the opening end of the battery can 11 by crimping via the sealing gasket 17. Thus, the secondary battery shown in FIG. 1 is obtained.

In the secondary battery according to the first embodiment, the positive electrode active material layer 21B contains the substituted perovskite oxide containing a substituted barium titanate. Thus, at the time of abnormal temperature rise of the battery due to short circuit or heating, the resistance of the substituted perovskite oxide contained in the positive electrode active material layer 21B is increased, thereby suppressing a current flowing in the positive electrode active material layer 21B (for example, short-circuit current), and thus suppressing the generation of Joule heat in the positive electrode 21. Accordingly, thermal runaway associated with Joule heat generation is suppressed, thereby improving short-circuit system safety (for example, safety evaluated by a collision test and a nail penetration test) and heating system safety (for example, safety evaluated by a heating test).

In the method for manufacturing a secondary battery according to the first embodiment, the substituted perovskite oxide is added at the end of the paint preparation step, that is, after mixing (kneading) the positive electrode active material, the binder, and the conductive agent, thus making it possible to reduce the number of contacts between the substituted perovskite oxide particles and the conductive agent particles. Accordingly, the inhibition of the resistance rising function at the time of abnormal temperature rise by the conductive agent can be suppressed. More specifically, the PTC function of the positive electrode 21 can be further improved, and the safety of the battery can be further improved.

Since the substituted perovskite oxide has not only the PTC function but also the dielectric function, the degree of dissociation of lithium salt can be improved, and the output characteristics of the battery can also be improved.

Since the inorganic compound is used as a material that has a PTC function, the instantaneous responsiveness to the increase in resistance can be improved.

Modification Example 1

The substituted barium titanate may be at least one of: a barium titanate in which contained barium is partially substituted with at least one of alkaline earth metals and rare-earth metals; and a barium titanate in which contained barium is partially substituted with at least one of alkaline earth metals and rare-earth metals and lead. In addition, the substituted barium titanate may be at least one of: a barium titanate in which contained barium and titanate are partially substituted with at least one of alkaline earth metals and rare-earth metals; and a barium titanate in which contained barium and titanate are partially substituted with at least one of alkaline earth metals and rare-earth metals and lead. In addition, the substituted barium titanate may be at least one of: a barium titanate in which contained titanium is partially substituted with at least one of alkaline earth metals and rare-earth metals; and a barium titanate in which contained titanium is partially substituted with at least one of alkaline earth metals and rare-earth metals and lead. In this regard, the alkaline earth metal is, for example, at least one of strontium and calcium. The rare earth metal is, for example, at least one of yttrium, neodymium, samarium, and dysprosium.

Modification Example 2

The positive electrode active material layer 21B may further contain a flame retardant. The flame retardant covers at least a part of the surface of the positive electrode active material particles. More specifically, the flame retardant partially covers the surface of the positive electrode active material particles, or covers the entire surface of the positive electrode active material particles. From the viewpoints of safety of the positive electrode 21 and suppression of gas generation, the flame retardant preferably covers the entire surface of the positive electrode active material particles.

The flame retardant may be entirely present in the positive electrode active material layer 21B or partially present in the positive electrode active material layer 21B, but from the viewpoint of improving the safety of the battery, is preferably entirely present in the positive electrode active material layer 21B. The concentration distribution of the flame retardant may be constant or varied in the thickness direction of the positive electrode active material layer 21B.

The flame retardant contains a melamine-based compound. The melamine-based compound contains at least one of melamine and a melamine derivative, and from the viewpoint of improving safety, it is preferable to contain a melamine derivative. The thermal decomposition onset temperature of the melamine-based compound is preferably 250° C. or higher, more preferably 300° C. or higher, and still more preferably 350° C. or higher, from the viewpoint of improving the safety of the battery.

The above-mentioned thermal decomposition onset temperature is determined as follows. The measurement sample is placed in a sample pan (alumina pan), and a weight curve is acquired with the use of a TG-Thermogravimetry-Differential Thermal Analysis (TG-DTA) analyzer. Thereafter, the weight loss onset temperature is read which appears in the acquired TG curve.

The melamine derivative is, for example, a melamine compound salt. The melamine compound salt contains at least one of, for example, a simple salt of an inorganic acid and melamine (hereinafter referred to as a "first inorganic acid salt"), a double salt of an inorganic acid, melamine, melem, and melam (hereinafter referred to as a "second inorganic acid salt"), and an organic acid salt of an organic acid and melamine.

The first inorganic acid salt preferably contains at least one of melamine borate, melamine polyborate, melamine phosphate, melamine pyrophosphate, melamine metaphosphate, and melamine polyphosphate. The melamine polyphosphate may be cyclic or chained.

The second inorganic acid salt preferably contains at least one of: a double salt of melamine pyrophosphate, melem, and melam; a double salt of melamine phosphate, melem, and melam; a double salt of melamine metaphosphate, melem, and melam; and a double salt of melamine polyphosphate, melem, and melam. The double salt of melamine polyphosphate, melem, and melam may be cyclic or chained.

The organic acid salt preferably contains a melamine cyanurate.

The flame retardant may contain at least one of red phosphorus and the compounds represented by the following formula, in addition to the above-mentioned melamine-based compound.

[Chemical Formula 1]

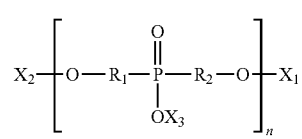

(in the formula, X1, X2, and X3 represent melamine-based compounds, and R1 and R2 represent hydrocarbon groups. n represents the degree of polymerization.)

Modification Example 3

A positive electrode combination may be prepared by mixing (kneading) a positive electrode active material, a substituted perovskite oxide, a conductive agent, and a binder, and this positive electrode combination may be dispersed in a solvent such as N-methyl-2-pyrrolidone (NMP), thereby preparing a positive electrode combination slurry as a paint. In order to reduce the number of contacts between the substituted perovskite oxide particles and the conductive agent particles and suppress the inhibition of the resistance increase function at the time of abnormal temperature rise due to the conductive agent, however, as in the first embodiment, it is preferable to add the substituted perovskite oxide after mixing (kneading) the positive electrode active material, the conductive agent, and the binder.

Modification Example 4

Although a case where the positive electrode active material layer 21B contains a substituted perovskite oxide has described in the first embodiment, the negative electrode active material layer 22B may contain a substituted perovskite oxide, or the positive electrode active material layer 21B and the negative electrode active material layer 22B may both contain a substituted perovskite oxide.

Figure 3:
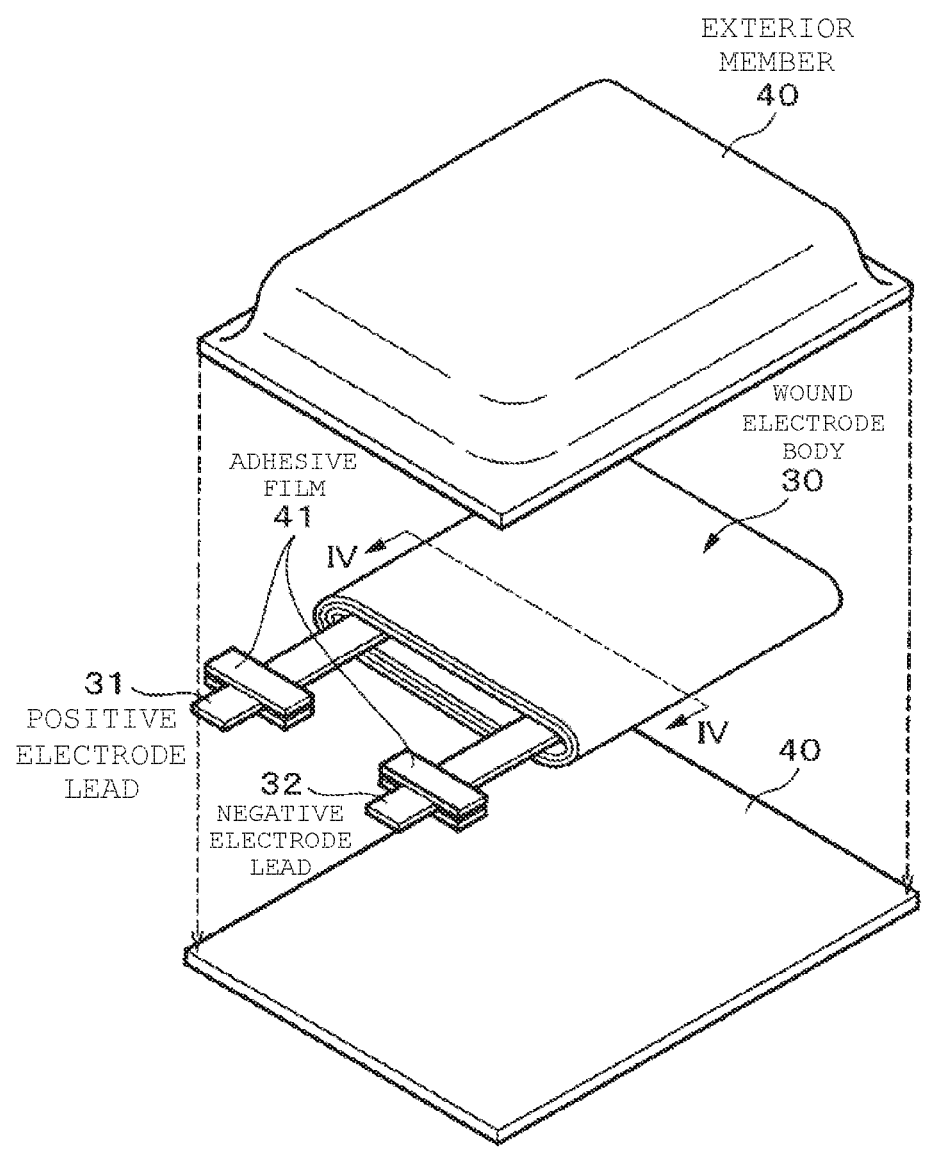
FIG. 3 is an exploded perspective view illustrating a configuration example of a secondary battery according to an embodiment of the present technology.

FIG. 3 is an exploded perspective view illustrating a configuration example of a secondary battery according to the second embodiment of the present technology. This secondary battery is what is referred to as a flattened type or a rectangular type, where a wound electrode body 30 with a positive electrode lead 31 and a negative electrode lead 32 attached thereto is housed in a film-like exterior member 40, thereby allowing for the reduction in size, the reduction in weight, and the reduction in thickness.

The positive electrode lead 31 and the negative electrode lead 32 are each led out from the inside of the exterior member 40 toward the outside, for example, in the same direction. Each of the positive electrode lead 31 and the negative electrode lead 32 is made from, for example, a metal material such as aluminum, copper, nickel, or stainless steel, and adapted to have the form of a thin plate or mesh.

The exterior member 40 is composed of, for example, a rectangular aluminum laminate film with a nylon film, an aluminum foil, and a polyethylene film bonded to each other in this order. The exterior member 40 is provided, for example, such that the polyethylene film side and the wound electrode body 30 are opposed to each other, and respective outer edges thereof are attached firmly to each other by fusion bonding or with an adhesive. Between the exterior member 40 and the positive electrode lead 31 and the negative electrode lead 32, an adhesive film 41 for preventing the intrusion of outside air is inserted. The adhesive film 41 is made from a material that has adhesiveness to the positive electrode lead 31 and the negative electrode lead 32, for example, a polyolefin resin such as polyethylene, polypropylene, modified polyethylene, or modified polypropylene.

It should be understood that the exterior member 40 may be composed of a laminate film that has another structure, a polymer film such as polypropylene, or a metal film, instead of the above-described aluminum laminate film. Alternatively, a laminate film may be used which has a polymer film laminated on one or both sides of an aluminum film as a core material.

Figure 4:
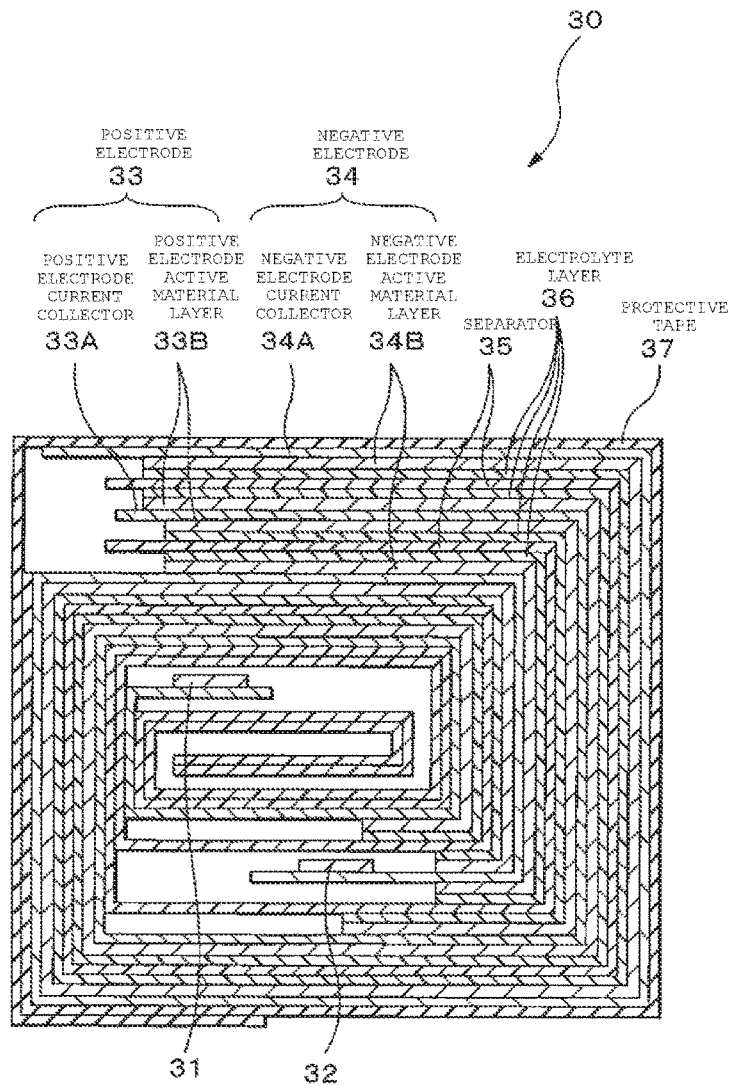
FIG. 4 is a cross-sectional view of the wound electrode body taken along the line IV-IV of FIG. 3.

FIG. 4 is a cross-sectional view of the wound electrode body 30 shown in FIG. 3, taken along the line IV-IV thereof. The wound electrode body 30 is obtained by stacking a positive electrode 33 and a negative electrode 34 with a separator 35 and an electrolyte layer 36 interposed therebetween, and is wound, and the outermost circumference is protected by a protective tape 37.

The positive electrode 33 has a structure with a positive electrode active material layer 33B provided on one or both surfaces of a positive electrode current collector 33A. The negative electrode 34 has a structure with a negative electrode active material layer 34B provided on one or both surfaces of the negative electrode current collector 34A, which is disposed so that the negative electrode active material layer 34B and the positive electrode active material layer 33B are opposed to each other. The positive electrode current collector 33A, the positive electrode active material layer 33B, the negative electrode current collector 34A, the negative electrode active material layer 34B, and the separator 35 are configured respectively in the same manner as the positive electrode current collector 21A, the positive electrode active material layer 21B, the negative electrode current collector 22A, the negative electrode active material layer 22B, and the separator 23 according to the first embodiment.

The electrolyte layer 36 includes an electrolytic solution, and a polymer compound to serve as a holding body for holding the electrolytic solution, and has a so-called gel-like form. The gel-like electrolyte layer 36 is preferred, because of being capable of achieving a high ionic conductivity, and preventing liquid leakage from the battery. The electrolytic solution is the electrolytic solution according to the first embodiment. Examples of the polymer compound include, for example, polyacrylonitrile, polyvinylidene fluoride, a copolymer of vinylidene fluoride and hexafluoropropylene, polytetrafluoroethylene, polyhexafluoropropylene, a polyethylene oxide, a polypropylene oxide, polyphosphazene, polysiloxane, polyvinyl acetate, polyvinyl alcohol, polymethyl methacrylate, a polyacrylic acid, a polymethacrylic acid, a styrene-butadiene rubber, a nitrile-butadiene rubber, polystyrene, or polycarbonate. In particular, from the viewpoint of electrochemical stability, polyacrylonitrile, polyvinylidene fluoride, polyhexafluoropropylene, or polyethylene oxide is preferred.

It should be understood that the gel-like electrolyte layer 36 may include therein the same inorganic substance as the inorganic substance described in the explanation of the resin layer for the separator 23 in the first embodiment. This is because the heat resistance can be further improved. Further, instead of the electrolyte layer 36, an electrolytic solution may be used.

Next, an example of a method for manufacturing the secondary battery according to the second embodiment of the present technology will be described.

First, a precursor solution including a solvent, an electrolyte salt, a polymer compound, and a mixed solvent is applied to each of the positive electrode 33 and the negative electrode 34, and the mixed solvent is volatilized to form the electrolyte layer 36. Next, the positive electrode lead 31 is attached by welding to an end of the positive electrode current collector 33A, and the negative electrode lead 32 is attached by welding to an end of the negative electrode current collector 34A. Next, the positive electrode 33 and the negative electrode 34 with the electrolyte layer 36 formed are stacked with the separator 35 interposed therebetween, thereby providing a stacked body, thereafter, the stacked body is wound in the longitudinal direction, and the protective tape 37 is bonded to the outermost circumference, thereby forming the wound electrode body 30. Finally, for example, the wound electrode body 30 is sandwiched between the exterior members 40, and the outer edges of the exterior members 40 are brought into close contact with each other for sealing by heat sealing or the like. In that regard, the adhesive film 41 is inserted between the positive electrode lead 31 and the negative electrode lead 32 and the exterior members 40. Thus, the secondary battery shown in FIG. 4 and FIG. 4 is obtained.

Alternatively, this secondary battery may be prepared in the following manner. First, the positive electrode 33 and the negative electrode 34 are prepared as described above, and the positive electrode lead 31 and the negative electrode lead 32 are attached to the positive electrode 33 and the negative electrode 34. Next, the positive electrode 33 and the negative electrode 34 are stacked with the separator 35 interposed therebetween, and then wound, and the protective tape 37 is bonded to the outermost circumference, thereby forming a wound body. Next, the wound body is sandwiched between the exterior members 40, and housed in the exterior members 40 by heat-sealing the outer circumferential edge excluding one side into a bag shape. Next, a composition for an electrolyte, which includes a solvent, an electrolyte salt, a monomer that is a raw material for the polymer compound, a polymerization initiator, and if necessary, other materials such as a polymerization inhibitor, is prepared, and injected into the exterior members 40.

Next, after injecting the composition for an electrolyte into the exterior members 40, the opening of the exterior members 40 is heat-sealed in a vacuum atmosphere. Next, heat is applied to polymerize the monomer and then provide a polymer compound, thereby forming the gel-like electrolyte layer 36. Thus, the secondary battery shown in FIG. 4 is obtained.

In the battery according to the first embodiment, the positive electrode active material layer 33B contains the substituted barium titanate, thus allowing the safety of the battery to be improved as in the first embodiment.

Figure 5:
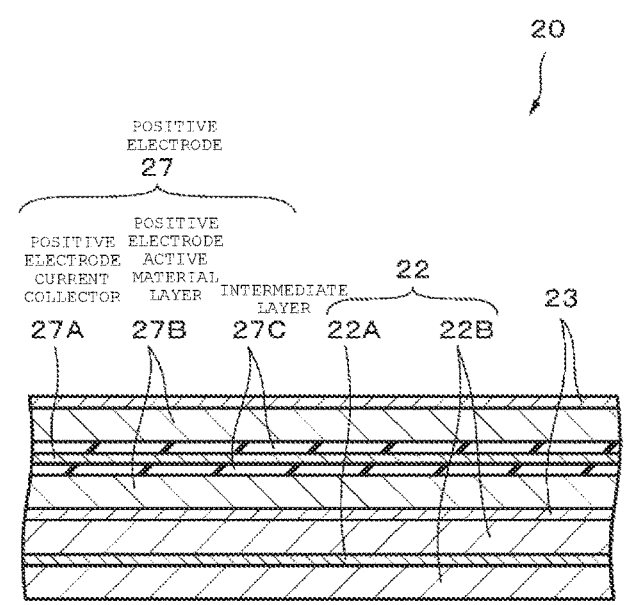
FIG. 5 is a cross-sectional view illustrating an example of the configuration of a secondary battery according to an embodiment of the present technology.

The secondary battery according to the third embodiment of the present technology is different from the secondary battery according to the first embodiment in that a positive electrode 27 is provided instead of the positive electrode 21 as shown in FIG. 5. The positive electrode 27 includes a positive electrode current collector 27A, a positive electrode active material layer 27B, and an intermediate layer 27C provided between the positive electrode current collector 27A and the positive electrode active material layer 27B. The intermediate layer 27C may be provided on one side of the positive electrode current collector 27A, or may be provided on both sides of the positive electrode current collector 27A, but from the viewpoint of suppressing the generation of Joule heat at the time of abnormal temperature rise, the intermediate layer 27C is preferably provided on both sides of the positive electrode current collector 27A.

The positive electrode current collector 27A is the same as the positive electrode current collector 21A according to the first embodiment. The positive electrode active material layer 27B is the same as the positive electrode active material layer 21B according to the first embodiment, except for containing no substituted perovskite oxide.

The intermediate layer 27C has a PTC function. This PTC function preferably has the characteristics of sharply increasing the resistance within the range of 100° C. or higher and 200° C. or lower. The intermediate layer 27C contains a substituted perovskite oxide, a binder, and a conductive agent. The substituted perovskite oxide, the binder, and the conductive agent are the same respectively as the substituted perovskite oxide, binder, and conductive agent contained in the positive electrode active material layer 21B according to the first embodiment.

Next, an example of a method for manufacturing the secondary battery according to the third embodiment of the present technology will be described.

First, for example, a combination is prepared by mixing a conductive agent and a binder, and this combination is mixed with a solvent such as N-methyl-2-pyrrolidone (NMP), thereby providing a mixture. Next, a substituted perovskite oxide is added to this mixture and dispersed therein to prepare a combination slurry as a paint for an intermediate layer formation. Subsequently, the intermediate layer 27C is formed by applying the combination slurry to the positive electrode current collector 27A and drying the solvent. If necessary, the intermediate layer 27C may be subjected to compression molding with a roll press or the like.

Next, for example, a positive electrode combination is prepared by mixing a positive electrode active material, a conductive agent, and a binder, and this positive electrode combination is dispersed in a solvent such as N-methyl-2-pyrrolidone (NMP), thereby preparing a paste-like positive electrode combination slurry. Subsequently, the positive electrode combination slurry is applied onto the intermediate layer 27C, and subjected to solvent drying, and to compression molding by a roll press machine or the like to form the positive electrode active material layer 27B. Thus, the positive electrode 27 is obtained. The subsequent steps are the same as the method for manufacturing the secondary battery according to the first embodiment.

In the secondary battery according to the third embodiment, the intermediate layer 27C is provided between the positive electrode current collector 27A and the positive electrode active material layer 27B, and thus, at the time of abnormal temperature rise of the battery due to short circuit or heating, the resistance of the substituted perovskite oxide contained in the intermediate layer 27C is increased, thereby suppressing a current flowing in the intermediate layer 27C (for example, short-circuit current), and thus suppressing the generation of Joule heat in the positive electrode 21. Accordingly, thermal runaway associated with Joule heat generation is suppressed, thereby improving short-circuit system safety (for example, safety evaluated by a collision test and a nail penetration test) and heating system safety (for example, safety evaluated by a heating test).

In the method for manufacturing a secondary battery according to the third embodiment, the substituted perovskite oxide is added at the end of the paint preparation step, that is, after mixing (kneading) the binder and the conductive agent, thus making it possible to reduce the number of contacts between the substituted perovskite oxide particles and the conductive agent particles. Accordingly, the inhibition of the resistance rising function at the time of abnormal temperature rise by the conductive agent can be suppressed. More specifically, the PTC function of the intermediate layer 27C can be further improved, and the safety of the battery can be further improved.

The positive electrode active material layer 27B may contain a substituted perovskite oxide. In addition, the positive electrode active material layer 27B may contain a flame retardant, or may contain both a substituted perovskite oxide and a flame retardant. The substituted perovskite oxide is the same as the substituted perovskite oxide contained in the positive electrode active material layer 21B according to the first embodiment. The flame retardant is the same as the flame retardant according to the Modification Example 2 of the first embodiment.

A combination may be prepared by mixing (kneading) a substituted perovskite oxide, a conductive agent, and a binder, and this combination may be dispersed in a solvent such as N-methyl-2-pyrrolidone (NMP), thereby preparing a combination slurry as a paint for intermediate layer formation. In order to reduce the number of contacts between the substituted perovskite oxide particles and the conductive agent particles and suppress the inhibition of the resistance increase function at the time of abnormal temperature rise due to the conductive agent, however, as in the first embodiment, it is preferable to add the substituted perovskite oxide after mixing (kneading) the conductive agent, and the binder.

Although a case where the positive electrode 27 includes the intermediate layer 27C has been described in the third embodiment, the negative electrode 22 may include the intermediate layer 27C, or the positive electrode 27 and the negative electrode 22 may both include the intermediate layer 27C. In a case where the negative electrode 22 includes the intermediate layer 27C, the intermediate layer 27C is provided between the negative electrode current collector 22A and the negative electrode active material layer 22B.

The intermediate layer 27C may contain the substituted barium titanate according to Modification Example 1 of the first embodiment. In addition, the secondary battery according to the second embodiment may include the positive electrode 27 instead of the positive electrode 33.

In Application Example 1, a battery pack and an electronic device that include a battery according to any of the first to third embodiments will be described.

A configuration example of a battery pack 300 and an electronic device 400 as an application example will be described below with reference to FIG. 5. The electronic device 400 includes an electronic circuit 401 of an electronic device main body, and the battery pack 300. The battery pack 300 is electrically connected to the electronic circuit 401 via a positive electrode terminal 331a and a negative electrode terminal 331b. The electronic device 400 has, for example, a configuration that allows the user to attach/detach the battery pack 300. It should be understood that the configuration of the electronic device 400 is not limited thereto, and the battery pack 300 may be configured to be built in the electronic device 400 so that the user is not allowed to remove the battery pack 300 from the electronic device 400.

In the case of charging the battery pack 300, the positive electrode terminal 331a and negative electrode terminal 331b of the battery pack 300 are respectively connected to a positive electrode terminal and a negative electrode terminal of a charger (not shown). On the other hand, in the case of discharging the battery pack 300 (in the case of using the electronic device 400), the positive electrode terminal 331a and negative electrode terminal 331b of the battery pack 300 are respectively connected to a positive electrode terminal and a negative electrode terminal of the electronic circuit 401.

Examples of the electronic device 400 include, but not limited to, notebook personal computers, tablet computers, mobile phones (for example, smartphones), personal digital assistants (Personal Digital Assistants: PDA), display devices (LCD, EL displays, electronic papers, etc.), imaging devices (for example, digital still cameras, digital video cameras, etc.), audio instruments (for example, portable audio players), game machines, cordless phone handsets, electronic books, electronic dictionaries, radios, headphones, navigation systems, memory cards, pacemakers, hearing aids, electric tools, electric shavers, refrigerators, air conditioners, television receivers, stereos, water heaters, microwave ovens, dishwashers, washing machines, driers, lighting devices, toys, medical devices, robots, road conditioners, and traffic lights.

The electronic circuit 401 includes, for example, a CPU, a peripheral logic unit, an interface unit, a storage unit, and the like, and controls the overall electronic device 400.

Figure 6:
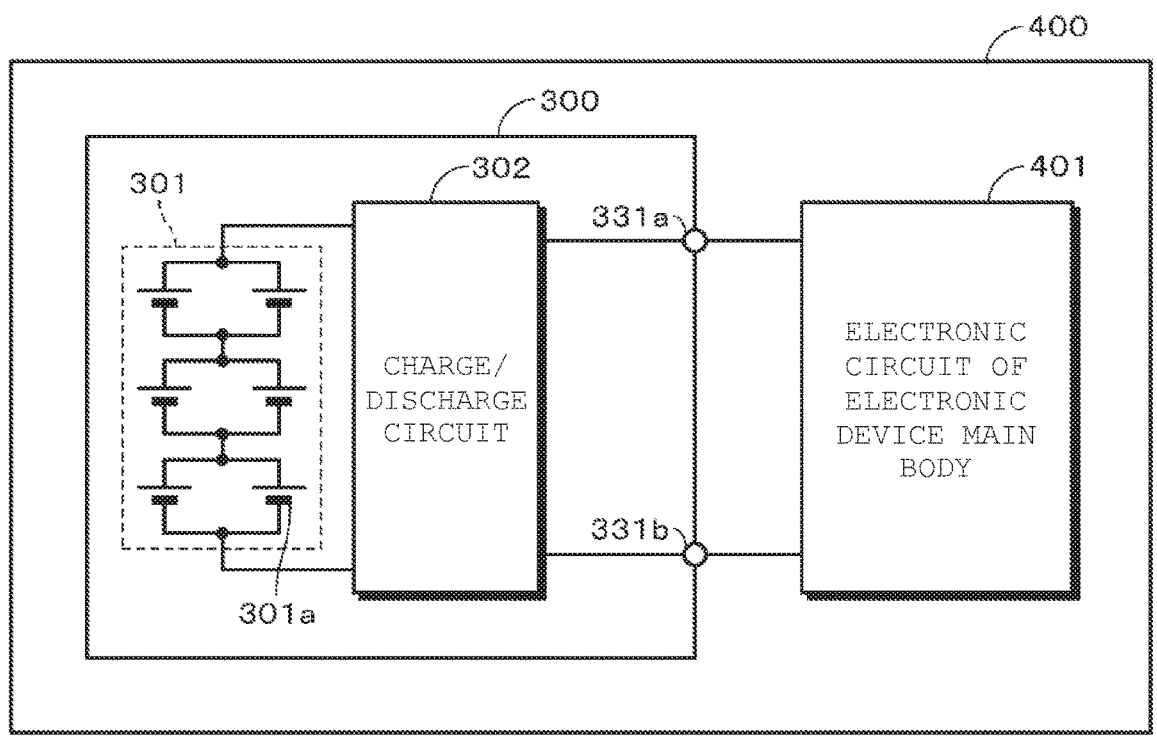
FIG. 6 is a block diagram illustrating an example of the configuration of an electronic device as an application example according an embodiment of the present technology.

The battery pack 300 includes an assembled battery 301 and a charge/discharge circuit 302. The assembled battery 301 is configured to have a plurality of secondary batteries 301a connected in series and/or in parallel. The plurality of secondary batteries 301a are connected so as to arrange, for example, n batteries in parallel and m batteries in serial (n and m are positive integers). It should be understood that FIG. 6 shows therein an example where six secondary batteries 301a are connected so as to arrange two batteries in parallel and three batteries in series (2P3S). The battery according to any of the first to third embodiments is used as the secondary battery 301a.

The case where the battery pack 300 includes the assembled battery 301 composed of the plurality of secondary batteries 301a is described herein, but a configuration may be adopted where the battery pack 300 includes a single secondary battery 301a in place of the assembled battery 301.

The charge/discharge circuit 302 is a control unit that controls charging/discharging the assembled battery 301. Specifically, in the case of charging, the charge/discharge circuit 302 controls charging the assembled battery 301. On the other hand, in the case of discharging (that is, in the case of using the electronic device 400), the charge/discharge circuit 302 controls discharging the electronic device 400.

Figure 7:
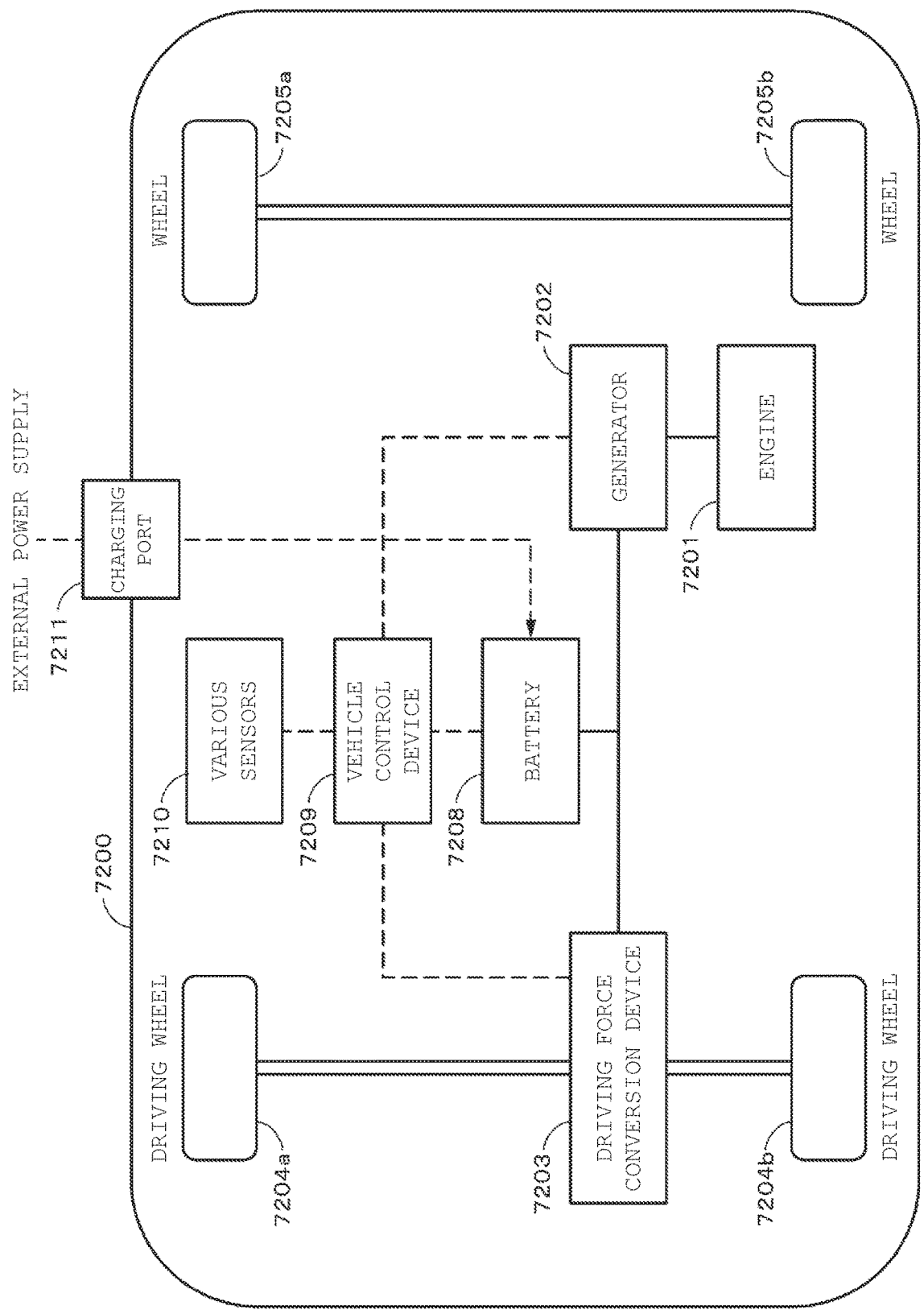
FIG. 7 is a schematic diagram illustrating an example of the configuration of an electric storage system in a vehicle as an application example according an embodiment of the present technology.

An example of applying the present disclosure to an electric storage system for a vehicle will be described with reference to FIG. 7. FIG. 7 schematically illustrates an example of the configuration of a hybrid vehicle that adopts a series hybrid system to which the present disclosure is applied. The series hybrid system is intended for a vehicle that runs on an electric power-driving force conversion device, with the use of electric power generated by a generator driven by an engine, or the electric power stored once in the battery.

The hybrid vehicle 7200 carries an engine 7201, a generator 7202, the electric power-driving force conversion device 7203 (converter), a driving wheel 7204a, a driving wheel 7204b, a wheel 7205a, a wheel 7205b, a battery 7208, a vehicle control device 7209 (controller including a processor), various sensors 7210, and a charging port 7211. The above-described power storage device according to the present disclosure is applied to the battery 7208.

The hybrid vehicle 7200 travels with the electric power-driving force conversion device 7203 as a power source. An example of the electric power-driving force conversion device 7203 (converter) is a motor. The electric power-driving force conversion device 7203 is operated by the electric power of the battery 7208, and the torque of the electric power-driving force conversion device 7203 is transmitted to the driving wheels 7204a and 7204b. It should be understood that the electric power-driving force conversion device 7203 can be applied to both an alternate-current motor and a direct-current motor by using direct current-alternate current (DC-AC) or reverse conversion (AC-DC conversion) in a required location. The various sensors 7210 control the engine rotation speed via the vehicle control device 7209, and control the position (throttle position) of a throttle valve, not shown. The various sensors 7210 include a speed sensor, an acceleration sensor, an engine rotation speed sensor, and the like.

The torque of the engine 7201 is transmitted to the generator 7202, and the torque makes it possible to reserve, in the battery 7208, the electric power generated by the generator 7202.

When the hybrid vehicle is decelerated by a braking mechanism, not shown, the resistance force during the deceleration is applied as torque to the electric power-driving force conversion device 7203, and the regenerative electric power generated by the electric power-driving force conversion device 7203 is reserved in the battery 7208 by the torque.

The battery 7208 is connected to a power source outside the hybrid vehicle, thereby making it also possible to receive electric power supply from the external power supply with the charging port 211 as an input port, and then reserve the received power.

Although not shown, the vehicle may be provided with an information processing device that performs information processing related to vehicle control, based on information on the secondary battery. Examples of such an information processing device include, for example, an information processing device that displays the remaining battery level, based on information on the remaining level of the battery.

It should be understood that as an example, the series hybrid vehicle has been described above, which runs on the motor with the use of the electric power generated by the generator driven by the engine, or the electric power stored once in the battery. However, the present disclosure can be also effectively applied to parallel hybrid vehicles which use the outputs of both an engine and a motor as a driving source, and appropriately switch three systems of running on only the engine, running on only the motor, and running on the engine and the motor. Furthermore, the present disclosure can be also effectively applied to so-called electric vehicles that run on driving by only a driving motor without using any engine.

An example of the hybrid vehicle 7200 to which the technique according to the present disclosure can be applied has been described above. The technology according to the present disclosure can be suitably applied to the battery 7208 in the configuration described above.

Figure 8:
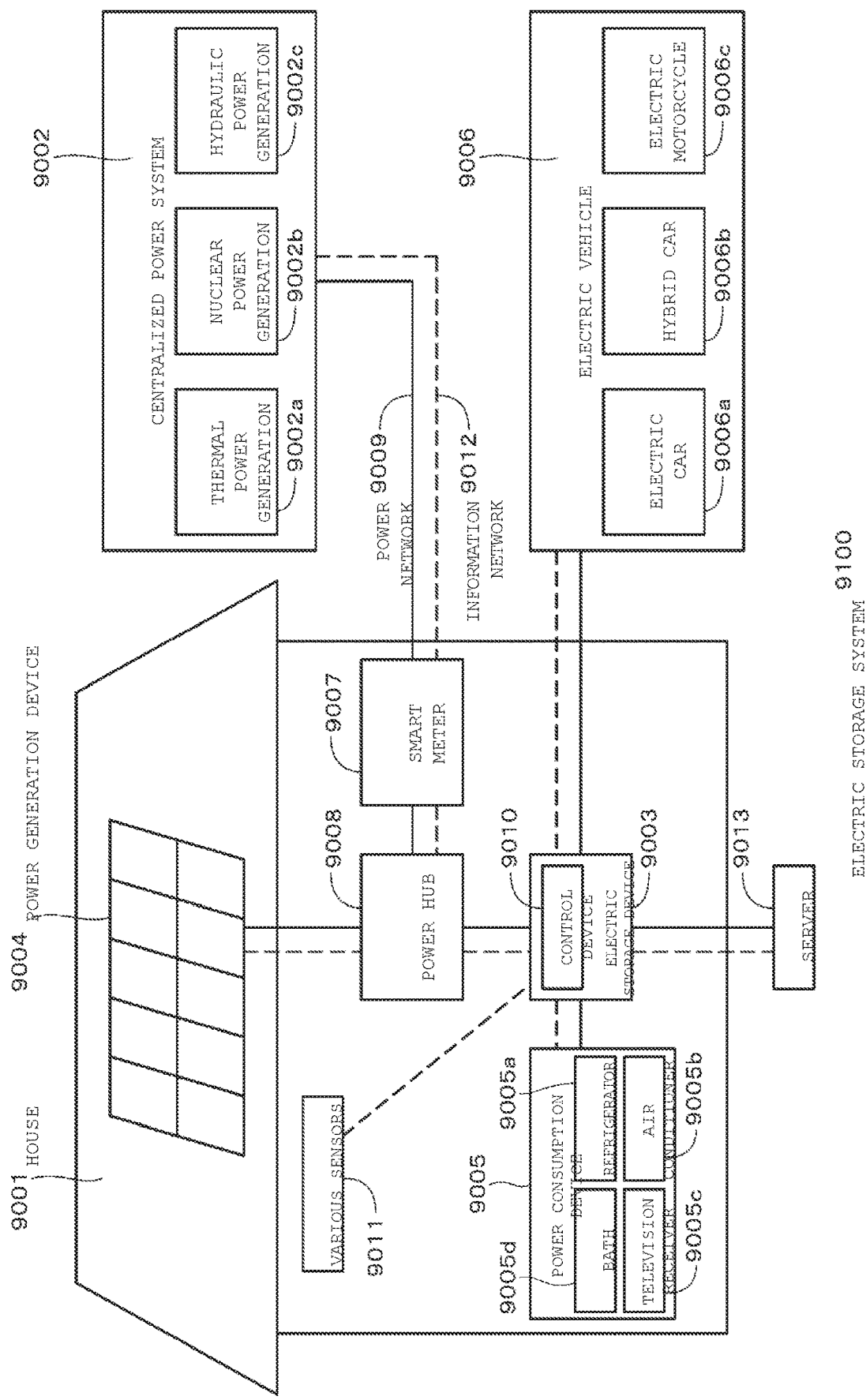
FIG. 8 is a schematic diagram illustrating an example of the configuration of an electric storage system in a house as an application example according an embodiment of the present technology.

An example of applying the present disclosure to a residential electric storage system will be described with reference to FIG. 8. For example, in an electric storage system 9100 for a house 9001, electric power is supplied to an electric storage device 9003 via a power network 9009, an information network 9012, a smart meter 9007, a power hub 9008, and the like, from a centralized power system 9002 such as a thermal power generation 9002a, a nuclear power generation 9002b, and a hydraulic power generation 9002c. At the same time, electric power is supplied to the electric storage device 9003 from an independent power source such as a home power generation device 9004. The electric power supplied to the electric storage device 9003 is stored. Electric power for use in the house 9001 is supplied through the use of the electric storage device 9003. The same electric storage system can be used not only for the house 9001 but also for buildings.

The house 9001 is provided with the power generation device 9004, a power consumption device 9005, the electric storage device 9003, a control device 9010 (controller) for controlling the respective devices, the smart meter 9007, and sensors 9011 for acquiring various types of information. The respective devices are connected by the power network 9009 and the information network 9012. As the power generation device 9004, a solar cell, a fuel cell, or the like is used, and electric power generated is supplied to the power consumption device 9005 and/or the electric storage device 9003. The power consumption device 9005 refers to a refrigerator 9005a, an air conditioner 9005b, a television receiver 9005c, a bath 9005d, and the like. Furthermore, the power consumption device 9005 includes an electric vehicle 9006. The electric vehicle 9006 refers to an electric car 9006a, a hybrid car 9006b, and an electric motorcycle 9006c.

The above-described battery unit according to the present disclosure is applied to the electric storage device 9003. The electric storage device 9003 is composed of a secondary battery or a capacitor. For example, the device is composed of a lithium-ion battery. The lithium ion battery may be stationary or may be used in the electric vehicle 9006. The smart meter 9007 has the function of measuring the commercial power usage and transmitting the measured usage to the electric power company. The power network 9009 may be any one or combination of direct-current power feeding, alternate-current power feed, and contactless power feeding.

The various sensors 9011 are, for example, a human sensor, an illuminance sensor, an object detection sensor, a power consumption sensor, a vibration sensor, a contact sensor, a temperature sensor, an infrared sensor, and the like. Information acquired by the various sensors 9011 is transmitted to the control device 9010. With the information from the sensor 9011, weather condition, the human condition, etc. can be grasped to control the power consumption device 9005 automatically, and thus minimize the energy consumption. Furthermore, the control device 9010 can transmit information on the house 9001 to an external electric power company or the like via the Internet.

The power hub 9008 performs processing such as power line branching and DC/AC conversion. Examples of the communication method of the information network 9012 connected to the control device 9010 include a method of using a communication interface such as a Universal Asynchronous Receiver-Transmitter: transmission/reception circuit for asynchronous serial communication (UART), and a method of using a sensor network in accordance with a wireless communication standard, such as Bluetooth (registered trademark), ZigBee, and Wi-Fi. The Bluetooth system, which is applied to multimedia communication, can perform one-to-many connection communication. The ZigBee uses the physical layer of the Institute of Electrical and Electronics Engineers (IEEE) 802.15.4. The IEEE 802.15.4 is a name of a short range wireless network standard referred to as Personal Area Network (PAN) or Wireless (W) PAN.

The control device 9010 is connected to an external server 9013. This server 9013 may be managed by any of the house 9001, an electric power company, and a service provider. The information transmitted and received by the server 9013 is, for example, power consumption information, life pattern information, power charges, weather information, natural disaster information, and information on electric power trade. These pieces of information may be transmitted to and received from a power consumption device (for example, a television receiver) in the home, but may be transmitted and received from a device outside the home (for example, a mobile phone). These pieces of information may be displayed on a device that has a display function, for example, a television receiver, a mobile phone, a Personal Digital Assistants (PDA), or the like.

The control device 9010 that controls each unit is composed of a CPU (Central Processing Unit) or a processor, a RAM (Random Access Memory), a ROM (Read Only Memory), and the like, and stored in the electric storage device 9003 in this example. The control device 9010 connected to the electric storage device 9003, the home power generation device 9004, the power consumption device 9005, the various sensors 9011, the server 9013 via the information network 9012, has the function of regulating, for example, the commercial power usage and the power generation. Further, the device may have a function such as handling a power trade in the power market.

As described above, the electric storage device 9003 can store therein electric power generated by not only the centralized power system 9002 such as the thermal power 9002a, the nuclear power 9002b, and the hydraulic power 9002c, but also the home power generation device 9004 (solar power generation, wind power generation). Therefore, even if the home power generation device 9004 fluctuates in generated power, it is possible to achieve control such as making the amount of power sent to the outside constant or discharging the power as needed. For example, the system can be also used such that electric power obtained by solar power generation is stored in the electric storage device 9003, and at night, night-time power at a lower rate is stored in the electric storage device 9003, and then, the power stored by the electric storage device 9003 is discharged and used in the daytime at a higher rate.

It should be understood that while an example of the control device 9010 stored in the electric storage device 9003 has been described in this example, the control device 9010 may be stored in the smart meter 9007, or may be configured alone. Furthermore, the electric storage system 9100 may be used for multiple homes in multiple dwelling houses, or may be used for multiple detached houses.

An example of the electric storage system 9100 to which the technology according to the present disclosure can be applied has been described above. The technology according to the present disclosure can be suitably applied to the secondary battery of the electric storage device 9003 in the configuration described above.

EXAMPLES

Hereinafter, the present technology will be specifically described with reference to examples, but the present technology is not to be considered limited to only these examples.

Examples 1 to 4

The positive electrodes were prepared as follows. First, a lithium cobalt composite oxide ($LiCoO_2$) as a positive electrode active material, Ketjen black as a conductive agent, and polyvinylidene fluoride (PVdF) as a binder were mixed at the mass ratios shown in Table 1, and then kneaded with a rotation-revolution mixer. Next, a powder barium lead strontium calcium titanate (($Ba_{0.65}Pb_{0.25}Sr_{0.05}Ca_{0.05}$)$TiO_3$) particles with an average particle size as shown in Table 1 as a powder of substituted barium titanate particles and an appropriate amount of NMP (N-methyl-2-pyrrolidone) were mixed with the kneaded product, and dispersed with a rotation-revolution mixer to obtain a positive electrode combination paint in the form of slurry. Subsequently, the positive electrode combination paint was applied to a 15 μm thick aluminum foil, dried at 120° C., pressurized with a hand press until reaching a volume density of 1.8 g/cc, and then subjected to vacuum drying, thereby preparing a band-shaped positive electrode. Finally, a positive electrode lead was attached to an exposed part of the positive electrode current collector of the positive electrode.

A negative electrode was prepared as follows. First, 10% by mass of silicon and 85.5% by mass of mesocarbon microbeads (MCMB) as a negative electrode active material, 1% by mass of fibrous carbon and 0.5% by mass of carbon black as a conductive agent, and 3 wt % of PVdF as a binder were mixed, thereby preparing a negative electrode combination. Next, the negative electrode combination was mixed with an appropriate amount of NMP, and was kneaded and dispersed with a rotation-revolution mixer to obtain a negative electrode combination paint in the form of slurry. Subsequently, the negative electrode combination paint was applied to a 12 μm thick copper foil, dried at 120° C., pressurized with a hand press until reaching a volume density of 1.8 g/cc, and then subjected to vacuum drying, thereby preparing a band-shaped silicon/graphite mixed negative electrode. Finally, a negative electrode lead was attached to an exposed part of the negative electrode current collector of the negative electrode.

A non-aqueous electrolytic solution was prepared as follows. First, ethylene carbonate (EC) and propylene carbonate (PC) were mixed so as to reach a volume ratio of EC:PC=1:1, thereby preparing a mixed solvent, and 3% by mass of fluoroethylene carbonate (4-fluoro-1,3-dioxolan-2-one:FEC) was added to the mixed solvent. Subsequently, a non-aqueous electrolytic solution was prepared by dissolving, in the mixed solvent, lithium hexafluorophosphate ($LiPF_6$) as an electrolyte salt so as to reach 1 M.

A laminate film type lithium ion secondary battery was prepared in the following way. First, the positive electrode and negative electrode prepared in the way described above were attached firmly with a separator composed of a microporous polyethylene film with a thickness of 7 μm, wound in a longitudinal direction, and a protective tape was attached to the outermost circumferential part, thereby forming a flattened wound electrode body. Subsequently, the wound electrode body was loaded between exterior members, and three sides of the exterior members were heat-sealed, while the other side was not heat-sealed so as to have an opening. In this regard, an adhesive film (50 μm thick acid-modified propylene film) was inserted between the positive electrode lead and the exterior member, and an adhesive film was inserted between the negative electrode lead and the exterior member. Moisture proof aluminum laminate films with a 25 μm thick nylon film, 40 μm thick aluminum foil, and a 30 μm thick polypropylene film laminated in order from the outermost layer were used as the exterior members. Thereafter, the non-aqueous electrolytic solution in the way described above was injected from the opening of the exterior members, and the remaining side of the exterior members was heat-sealed under reduced pressure, and thus hermetically sealed. Thus, an intended laminate film-type lithium ion secondary battery was obtained. It should be understood that the lithium ion secondary battery is designed by adjusting the amount of positive electrode active material and the amount of negative electrode active material such that the open circuit voltage (i.e., battery voltage) in the case of full charging is 4.45 V.

Example 5

A secondary battery was prepared in the same way as in Example 1, except that a positive electrode combination was prepared by mixing the respective materials (positive electrode active material, conductive agent, binder, and powder of substituted barium titanate particles) at the ratios by mass shown in Table 1, with the use of a powder of barium bismuth sodium titanate ($Ba_{0.8}Bi_{0.1}Na_{0.1}$)$TiO_3$ particles with the average particle size shown in Table 1 as the powder of substituted barium titanate particles.

Example 6

A secondary battery was prepared in the same way as in Example 1, except that a positive electrode combination was prepared by mixing the respective materials (positive electrode active material, conductive agent, binder, and powder of substituted barium titanate particles) at the ratios by mass shown in Table 1, with the use of a powder of barium strontium titanate ($(Ba_{0.9}Sr_{0.1})TiO_3$) particles with the average particle size shown in Table 1 as the powder of substituted barium titanate particles.

Comparative Example 1

A positive electrode was prepared in the same way as in Example 1, except that a positive electrode combination was prepared by mixing the respective materials (positive electrode active material, conductive agent, and binder) excluding the powder of substituted barium titanate particles at the ratios by mass shown in Table 1, without any powder of substituted barium titanate particles.

Comparative Example 2

A secondary battery was prepared in the same way as in Example 1, except that a positive electrode combination was prepared by mixing the respective materials (positive electrode active material, conductive agent, binder, and powder of barium titanate particles) at the ratios by mass shown in Table 1, with the use of a powder of barium titanate ($BaTiO_3$) particles with the average particle size shown in Table 1 instead of the powder of substituted barium titanate particles.

(Impedance, Impedance Ratio)

Figure 9:
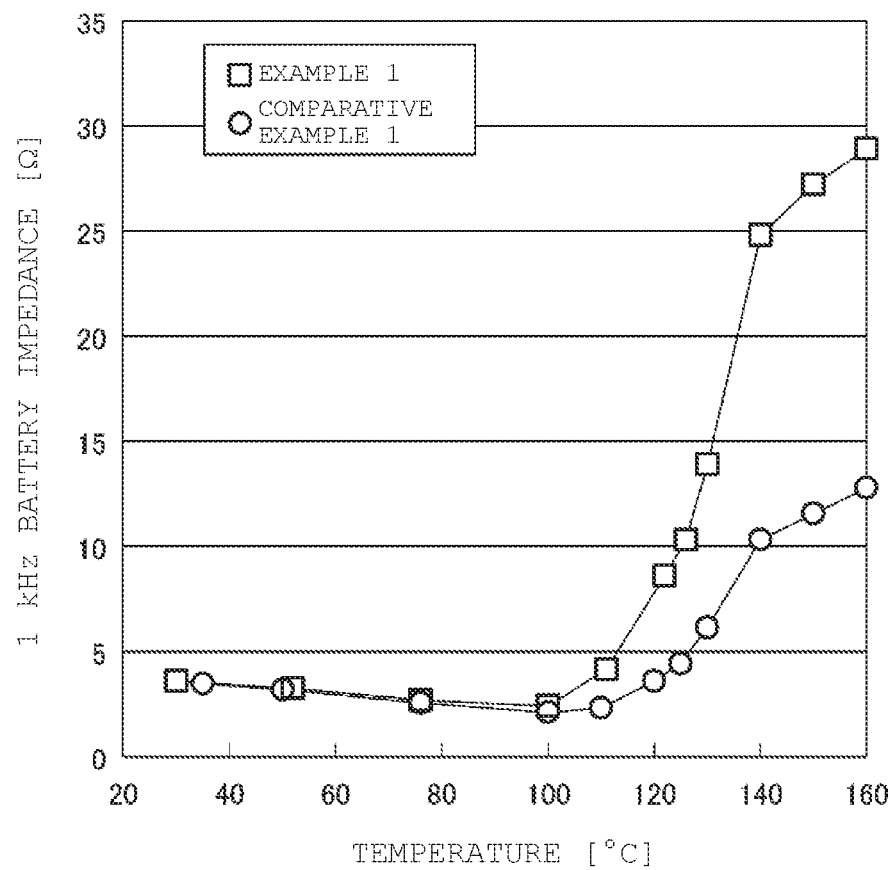
FIG. 9 is a graph showing dependences of impedance on temperature for batteries Example 1 and Comparative Example 1 according an embodiment of the present technology.

First, with the use of a battery high tester (manufactured by HIOKI E.E. CORPORATION, model: 3561), the impedance at 1 kHz was measured while heating the 4.45 V fully charged battery in the range from 30° C. to 160° C. Next, among the measured impedances, the impedance $Z(30° C.)$ and impedance $Z(150° C.)$ at 30° C. and 150° C. were used to determine the impedance ratio ($Z(150° C.)/Z(30° C.)$). The results are shown in Table 1. In addition, FIG. 9 shows the dependences of impedance on temperature for the batteries according to Example 1 and Comparative Example 1.

Table 1 shows the configurations and evaluation results of the batteries according to Examples 1 to 6 and Comparative Examples 1 and 2.

According to Examples 1 to 6, the positive electrode active material layer contains the substituted perovskite oxide containing the substituted barium titanate, thus allowing the impedance ratio ($Z(150° C.)/Z(30° C.)$) of 4.4 or more.

According to Comparative Example 1, the positive electrode active material layer fails to contain the substituted perovskite oxide containing the substituted barium titanate, thus making the impedance ratio ($Z(150° C.)/Z(30° C.)$) as low as 3.3.

According to Comparative Example 2, the positive electrode active material layer contains the barium titanate, thus allowing the impedance ratio ($Z(150° C.)/Z(30° C.)$) of 4.0. However, the rate of increase in impedance ratio due to the addition of the addition of the barium titanate is lower than the rate of increase in impedance ratio by the addition of the substituted perovskite oxide.

Accordingly, the positive electrode active material layer contains the substituted perovskite oxide containing the substituted barium titanate, thereby making it possible to suppress the generation of Joule heat in the positive electrode at the time of abnormal temperature rise of the battery, and improve the safety of the battery. In addition, the effect of safety improvement by the addition of the substituted perovskite oxide is more advantageous than the effect of safety improvement by the addition of the barium titanate.

While the embodiments and examples of the present have been concretely described above, the present technology is not to be considered limited to the embodiments and examples described above, and it is possible to make various modifications based on technical idea of the present technology.

For example, the configurations, methods, steps, shapes, materials, numerical values, and the like cited in the above-described embodiments and examples are considered by way of example only, and configurations, methods, steps, shapes, materials, and numerical values may be used which are different from the foregoing, if necessary.

Further, the configurations, methods, steps, shapes, materials, numerical values, and the like in the above-described embodiments and examples can be combined with each other, without departing from the scope of the present technology.

In addition, in the above-described embodiments and examples, examples of applying the present technology to cylindrical and laminate-film type secondary batteries have been described, but the shape of the battery is not to be considered particularly limited. For example, it is also possible to apply the present technology to secondary batteries such as rectangular or coin-type secondary batteries, and it is also possible to apply the present technology to flexible batteries and the like mounted on wearable terminals such as smartwatches, head-mount displays, and iGlass (registered trademark).

In addition, in the above-described embodiments and examples, examples of applying the present technology to

TABLE 1

| | Type of Additive | Average Particle Size D50 [μm] | Composition Ratio [% by mass] | | | | Impedance at 150° C. and 1 kHz [Ω] | Impedance at 30° C. and 1 kHz [Ω] | Impedance Ratio (150° C./30° C.) |
| | | | Lithium Cobalt Oxide | Conductive Agent | PVdF | Additive | | | |
|---|---|---|---|---|---|---|---|---|---|
| Example 1 | $(Ba_{0.65}Pb_{0.25}Sr_{0.05}Ca_{0.05})TiO_3$ | 30 | 97.00 | 0.80 | 2.00 | 0.20 | 27.2 | 3.6 | 7.6 |
| Example 2 | $(Ba_{0.65}Pb_{0.25}Sr_{0.05}Ca_{0.05})TiO_3$ | 30 | 97.15 | 0.80 | 2.00 | 0.20 | 22.2 | 3.4 | 6.5 |
| Example 3 | $(Ba_{0.65}Pb_{0.25}Sr_{0.05}Ca_{0.05})TiO_3$ | 0.3 | 97.00 | 0.80 | 2.00 | 0.20 | 23.0 | 3.3 | 7.0 |
| Example 4 | $(Ba_{0.65}Pb_{0.25}Sr_{0.05}Ca_{0.05})TiO_3$ | 0.05 | 97.00 | 0.80 | 2.00 | 0.20 | 14.5 | 3.3 | 4.4 |
| Example 5 | $(Ba_{0.8}Bi_{0.1}Na_{0.1})TiO_3$ | 1 | 97.00 | 0.80 | 2.00 | 0.20 | 22.0 | 3.5 | 6.3 |
| Example 6 | $(Ba_{0.9}Sr_{0.1})TiO_3$ | 1 | 97.00 | 0.80 | 2.00 | 0.20 | 20.8 | 3.7 | 5.6 |
| Comparative Example 1 | No | — | 97.20 | 0.80 | 2.00 | 0.20 | 11.6 | 3.5 | 3.3 |
| Comparative Example 2 | $BaTiO_3$ | 0.2 | 97.00 | 0.80 | 2.00 | 0.20 | 24.7 | 6.2 | 4.0 | wound-type and stack-type secondary batteries have been described, but the structure of the battery is not to be considered limited thereto, and for example, and it is also possible to apply to the present technology to a secondary battery that has a structure with a positive electrode and a negative electrode folded, and the like.

In addition, in the above-described embodiments and the examples, examples of applying the present technology to a lithium ion secondary battery and a lithium ion polymer secondary battery have been described, but the type of the battery to which the present technology is applicable is not to be considered limited thereto. For example, the present technology may be applied to bulk-type all solid state batteries and the like.

In addition, in the above-described embodiments and examples, the electrodes each configured to include a current collector and an active material layer have been described as an example, but the configurations of the electrodes are not to be considered limited thereto. For example, the electrodes may be each configured to be composed of only the active material layer.

Further, the present technology is described below in further detail according to an embodiment of the present disclosure.

(1) A battery including a positive electrode, a negative electrode, and an electrolyte, where the positive electrode contains a substituted barium titanate.

(2) The battery according to (1), where the substituted barium titanate has a PTC function.

(3) The battery according to (1) or (2), where the positive electrode has a PTC function.

(4) The battery according to any of (1) to (3), where the substituted barium titanate contains at least one of: a barium titanate with barium partially substituted with at least one element of alkaline earth metals; a barium titanate with barium partially substituted with at least one element of alkaline earth metals and lead; and a barium titanate with barium partially substituted with at least one element of alkali metals and bismuth.

(5) The battery according to any of (1) to (3), where the substituted barium titanate contains at least one of barium strontium titanate, barium bismuth sodium titanate, and barium strontium calcium lead titanate.

(6) The battery according to (5), where the barium strontium titanate, the barium bismuth sodium titanate, and the barium strontium calcium lead titanate are represented respectively by the following formulas (1), (2), and (3):

$$(Ba_{1-v}Sr_v)TiO_3 \quad (1)$$

(in the formula (1), v meets 0<v≤0.5)

$$(Ba_{1-u-w}Bi_uNa_w)TiO_3 \quad (2)$$

(in the formula (2), u meets 0<u<0.5, and w meets 0<w<0.5)

$$(Ba_{1-x-y-z}Pb_xSr_yCa_z)TiO_3 \quad (3)$$

(in the formula (3), x meets 0<x≤0.5, y meets 0<y≤0.2, and z meets 0<z≤0.2)

(7) The battery according to (2) or (3), where the PTC function is a function by which the resistance of the substituted barium titanate is increased by twice or more within the range of 100° C. or higher and 200° C. or lower.

(8) The battery according to any of (1) to (7), where the positive electrode includes a positive electrode active material, and an average particle size of the substituted barium titanate is 20 nm or more and not more than the average particle size of the positive electrode active material.

(9) The battery according to any of (1) to (8), where an impedance ratio (Z2/Z1) between an impedance Z1 of the battery at 30° C. and an impedance Z2 of the battery at 150° C. is 4 or more.

(10) The battery according to any of (1) to (9), where the positive electrode includes:
a positive electrode current collector;
a positive electrode active material layer; and
an intermediate layer provided between the positive electrode current collector and the positive electrode active material layer, and
the intermediate layer contains the substituted barium titanate.

(11) The battery according to any of (1) to (9), where the positive electrode includes a positive electrode active material layer, and
the substituted barium titanate is present in an entire positive electrode active material layer.

(12) A battery including a positive electrode, a negative electrode, and an electrolyte, and
where the positive electrode contains a substituted perovskite oxide that has a PTC function.

(13) A positive electrode containing a substituted barium titanate.

(14) A method for manufacturing a battery, which includes:
preparing a paint by mixing a positive electrode active material, a binder, and a conductive agent, and then adding a substituted barium titanate to the mixture, and
forming a positive electrode active material layer with the use of the paint.

(15) A battery pack including:
the battery according to any of (1) to (12); and
a control unit that controls the battery.

(16) An electronic device including the battery according to any of (1) to (12),
where the device receives power supply from the battery.

(17) An electric vehicle including:
the battery according to any of (1) to (12);
a conversion device that receives power supply from the battery to convert the power to a driving force for the vehicle; and
a control device that performs information processing related to vehicle control, based on information on the battery.

(18) An electric storage device including the battery according to any of (1) to (12),
where the electric storage device supplies electric power to an electronic device connected to the battery.

(19) An electric power system including the battery according to any of (1) to (12),
where the electric system receives power supply from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A battery, comprising:
a positive electrode, a negative electrode, and an electrolyte, wherein the positive electrode includes a substituted barium titanate including barium strontium calcium lead titanate;

wherein the barium strontium calcium lead titanate is represented by a formula (1):

$$(Ba_{1-x-y-z}Pb_xSr_yCa_z)TiO_3 \qquad (1)$$

wherein in the formula (1), x meets $0<x\le0.5$, y meets $0<y\le0.2$, and z meets $0<z\le0.2$;

wherein the positive electrode further includes a positive electrode active material and a conductive agent, and an average particle size of the substituted barium titanate is 20 nm or more and not more than an average particle size of the positive electrode active material;

wherein the positive electrode includes a positive electrode active material layer;

wherein the substituted barium titanate is provided in an entire of the positive electrode active material layer;

wherein an impedance ratio (Z2/Z1) between an impedance Z1 of the battery at 30° C. and an impedance Z2 of the battery at 150° C. is 4 or more.

2. The battery according to claim 1, wherein the substituted barium titanate has a PTC function.

3. The battery according to claim 2, wherein the PTC function is a function by which a resistance of the substituted barium titanate is increased by twice or more within a range of 100° C. or higher and 200° C. or lower.

4. The battery according to claim 1, wherein the positive electrode has a PTC function.

5. The battery according to claim 1, wherein the positive electrode includes:
a positive electrode current collector;
the positive electrode active material layer; and
an intermediate layer provided between the positive electrode current collector and the positive electrode active material layer, and
wherein the intermediate layer includes the substituted barium titanate.

6. The battery according to claim 1, wherein the substituted barium titanate is a powder of substituted barium titanate particles, wherein the conductive agent is a powder of conductive agent particles, and wherein the impedance ratio (Z2/Z1) between the impedance Z1 of the battery at 30° C. and an impedance Z2 of the battery at 150° C. is 4 or more based on a reduced number of contacts between the substituted barium titanate particles and the conductive agent particles.

7. The battery according to claim 1,
wherein an average particle size of the substituted barium titanate is 1μm or more.

8. The battery according to claim 7, wherein the conductive agent is a powder of conductive agent particles, and wherein the substituted barium titanate is a powder of substituted barium titanate particles.

9. The battery according to claim 8, wherein a specific surface area ratio of the substituted barium titanate particles to a specific surface area of the conductive agent particles is preferably 0.01 or more and 0.2 or less.

10. A battery pack comprising:
the battery according to claim 1; and
a controller configured to control the battery.

11. An electronic device comprising the battery according to claim 1,
wherein the electronic device is configured to receive power supply from the battery.

12. An electric vehicle comprising:
the battery according to claim 1;
a converter configured to receive power supply from the battery to convert the power to a driving force for the electric vehicle; and
a controller configured to perform information processing related to vehicle control, based on information on the battery.

13. An electric storage device comprising the battery according to claim 1,
wherein the electric storage device is configured to supply power to an electronic device connected to the battery.

14. An electric power system comprising the battery according to claim 1,
wherein the electric power system is configured to receive power supply from the battery.

15. A method for manufacturing a battery, the method comprising:
preparing a paint by mixing a positive electrode active material, a binder, and a conductive agent, and then adding a substituted barium titanate to the mixture, and
forming a positive electrode active material layer with use of the paint,
wherein the barium strontium calcium lead titanate is represented by a formula (1):

$$(Ba_{1-x-y-z}Pb_xSr_yCa_z)TiO_3 \qquad (1)$$

wherein in the formula (1), x meets $0<x\le0.5$, y meets $0<y\le0.2$, and z meets $0<z\le0.2$, wherein an average particle size of the substituted barium titanate is 20 nm or more and not more than an average particle size of the positive electrode active material, wherein the substituted barium titanate is provided in an entire of the positive electrode active material layer, and wherein an impedance ratio (Z2/Z1) between an impedance Z1 of the battery at 30° C. and an impedance Z2 of the battery at 150° C. is 4 or more.

* * * * *